US012511972B2

(12) United States Patent
Mitsusada et al.

(10) Patent No.: US 12,511,972 B2
(45) Date of Patent: Dec. 30, 2025

(54) MONEY HANDLING APPARATUS

(71) Applicant: GLORY LTD., Himeji (JP)

(72) Inventors: Yoshikazu Mitsusada, Himeji (JP); Takuro Hamada, Himeji (JP); Yusuke Yoshida, Himeji (JP); Masato Takeuchi, Himeji (JP)

(73) Assignee: GLORY LTD., Himeji (JP)

( * ) Notice: Subject to any disclaimer, the term of this patent is extended or adjusted under 35 U.S.C. 154(b) by 0 days.

(21) Appl. No.: 18/902,995

(22) Filed: Oct. 1, 2024

(65) Prior Publication Data

US 2025/0111726 A1 Apr. 3, 2025

(30) Foreign Application Priority Data

Oct. 2, 2023 (JP) ................................ 2023-171656

(51) Int. Cl.
*G07D 11/14* (2019.01)
*G07D 11/00* (2019.01)

(52) U.S. Cl.
CPC ........... *G07D 11/14* (2019.01); *G07D 11/009* (2013.01); *G07D 2201/00* (2013.01); *G07D 2211/00* (2013.01)

(58) Field of Classification Search
None
See application file for complete search history.

(56) References Cited

U.S. PATENT DOCUMENTS

2019/0147683 A1* 5/2019 Kobayashi ............. G07D 11/10 235/379
2021/0375085 A1* 12/2021 Hirayama ................ G07G 1/01

FOREIGN PATENT DOCUMENTS

EP 3364376 A1 * 8/2018 ............... G07D 1/02
JP 2008-276539 A 11/2008

OTHER PUBLICATIONS

Extended European Search Report issued on Dec. 6, 2024 in European Patent Application No. 24203770.3.

* cited by examiner

*Primary Examiner* — Kristy A Haupt
(74) *Attorney, Agent, or Firm* — XSENSUS LLP

(57) ABSTRACT

A money handling apparatus includes a banknote handling assembly, a coin handling assembly, and a first operation surface having a banknote inlet portion, a banknote outlet portion, a coin inlet portion, and a coin outlet portion and facing a front direction in a front-back direction of the money handling apparatus. The banknote inlet portion and the coin inlet portion are aligned and the banknote outlet portion and the coin outlet portion are aligned in a right-left direction of the money handling apparatus, which is perpendicular to the front-back direction. The banknote inlet portion and the banknote outlet portion overlap and the coin inlet portion and the coin outlet portion overlap in the up-down direction of the money handling apparatus, which is perpendicular to the right-left direction and perpendicular to the front-back direction.

18 Claims, 13 Drawing Sheets

DEPOSITING PROCESS
(MONEY RECEPTION)

DISPENSING PROCESS
(CHANGE DISPENSING)

MONEY HANDLING APPARATUS

CROSS-REFERENCE TO RELATED APPLICATION

This application claims priority under 35 U.S.C. Section 119 of Japanese Patent Application No. 2023-171656 filed Oct. 2, 2023, entitled “MONEY HANDLING APPARATUS”. The disclosure of the above application is incorporated herein by reference.

BACKGROUND

The present disclosure relates to a money handling apparatus.

DESCRIPTION OF RELATED ART

There is a settlement operation assembly in which a money handling apparatus including a banknote depositing/dispensing device and a coin depositing/dispensing device is built in a housing and in which a banknote inlet, a banknote reception port, a coin inlet, and a coin reception port are placed in a front panel as an operation device operated by a user for settlement. In the front panel, the banknote inlet is placed at an upper left position, the banknote reception port is placed at a lower left position, the coin inlet is placed at an upper right position, and the coin reception port is placed at a lower right position.

In the above settlement operation assembly, the banknote inlet and the coin inlet are placed at positions away from each other in the height direction, that is, at positions that do not overlap when viewed in the right-left direction of the front panel. Therefore, it is difficult for a user to recognize the banknote inlet and the coin inlet as the same inlet. Thus, for example, there is a concern that it may become difficult to insert banknotes and coins.

SUMMARY

A main aspect of the present disclosure is directed to a money handling apparatus. The money handling apparatus according to this aspect includes: a banknote handling assembly configured to handle banknotes; a coin handling assembly configured to handle coins; and a first operation surface having a banknote inlet portion into which banknotes to be deposited into the banknote handling assembly are inserted, a banknote outlet portion to which banknotes dispensed from the banknote handling assembly are discharged, a coin inlet portion into which coins to be deposited into the coin handling assembly are inserted, and a coin outlet portion to which coins dispensed from the coin handling assembly are discharged and facing a front direction in a front-back direction of the money handling apparatus. The banknote inlet portion and the coin inlet portion are aligned and the banknote outlet portion and the coin outlet portion are aligned in a right-left direction of the money handling apparatus, which is perpendicular to the front-back direction. The banknote inlet portion and the banknote outlet portion overlap and the coin inlet portion and the coin outlet portion overlap in the up-down direction of the money handling apparatus, which is perpendicular to the right-left direction and perpendicular to the front-back direction.

In the money handling apparatus according to this aspect, the banknote inlet portion and the coin inlet portion are arranged side by side at the same height position, so that it is easier for a user to recognize that these inlet portions are the same inlet portion. Therefore, it becomes easier for the user to smoothly insert banknotes and coins into the banknote inlet portion and the coin inlet portion.

In addition, since the banknote outlet portion and the coin outlet portion are arranged side by side at the same height position, it is easier for the user to recognize that these outlet units are the same outlet portion. Therefore, it becomes easier for the user to smoothly take out banknotes and coins from the banknote outlet portion and the coin outlet portion.

Furthermore, since the height positions of the banknote inlet portion and the coin inlet portion are the same, the height positions of the banknote outlet portion and the coin outlet portion are the same, and the positions of the banknote inlet portion and the banknote outlet portion coincide and the positions of the coin inlet portion and the coin outlet portion coincide in the right-left direction of the first operation surface, the banknote inlet portion, the banknote outlet portion, the coin inlet portion, and the coin outlet portion are easily gathered together. Therefore, it becomes easier for the user to perform a series of operations from insertion to taking-out of banknotes and coins. Furthermore, since the banknote inlet portion, the banknote outlet portion, the coin inlet portion, and the coin outlet portion are gathered together, the apparatus can be easily made compact.

The effects and the significance of the present disclosure will be further clarified by the description of the embodiment below. However, the embodiment below is merely an example for implementing the present disclosure. The present disclosure is not limited to the description of the embodiment below in any way.

It should be noted that the drawings are solely for description and do not limit the scope of the present disclosure by any degree.

DETAILED DESCRIPTION

Hereinafter, an embodiment of the present disclosure will be described with reference to the drawings.

In the present embodiment, the money handling apparatus of the present disclosure is applied to an automatic transaction apparatus that receives input of an instruction for a transaction and settles a monetary amount corresponding to the transaction. That is, an automatic transaction apparatus 1 of the present embodiment has a configuration in which an operation display apparatus 1B that receives an instruction for a transaction and performs electronic settlement is integrally placed on a money handling apparatus 1A that performs cash settlement with money (banknotes and coins). The automatic transaction apparatus 1 is installed in a store for sale of commodities, provision of services, or the like. Instructions for transactions are, for example, instructions for ordering commodities such as food and drink to be purchased by users, or services to be received by users.

However, the money handling apparatus according to the present disclosure is not limited to the apparatus applied to an automatic transaction apparatus, and may be another apparatus such as an automated teller machine (ATM) as long as the apparatus deposits and dispenses banknotes and coins.

Figure 1B:
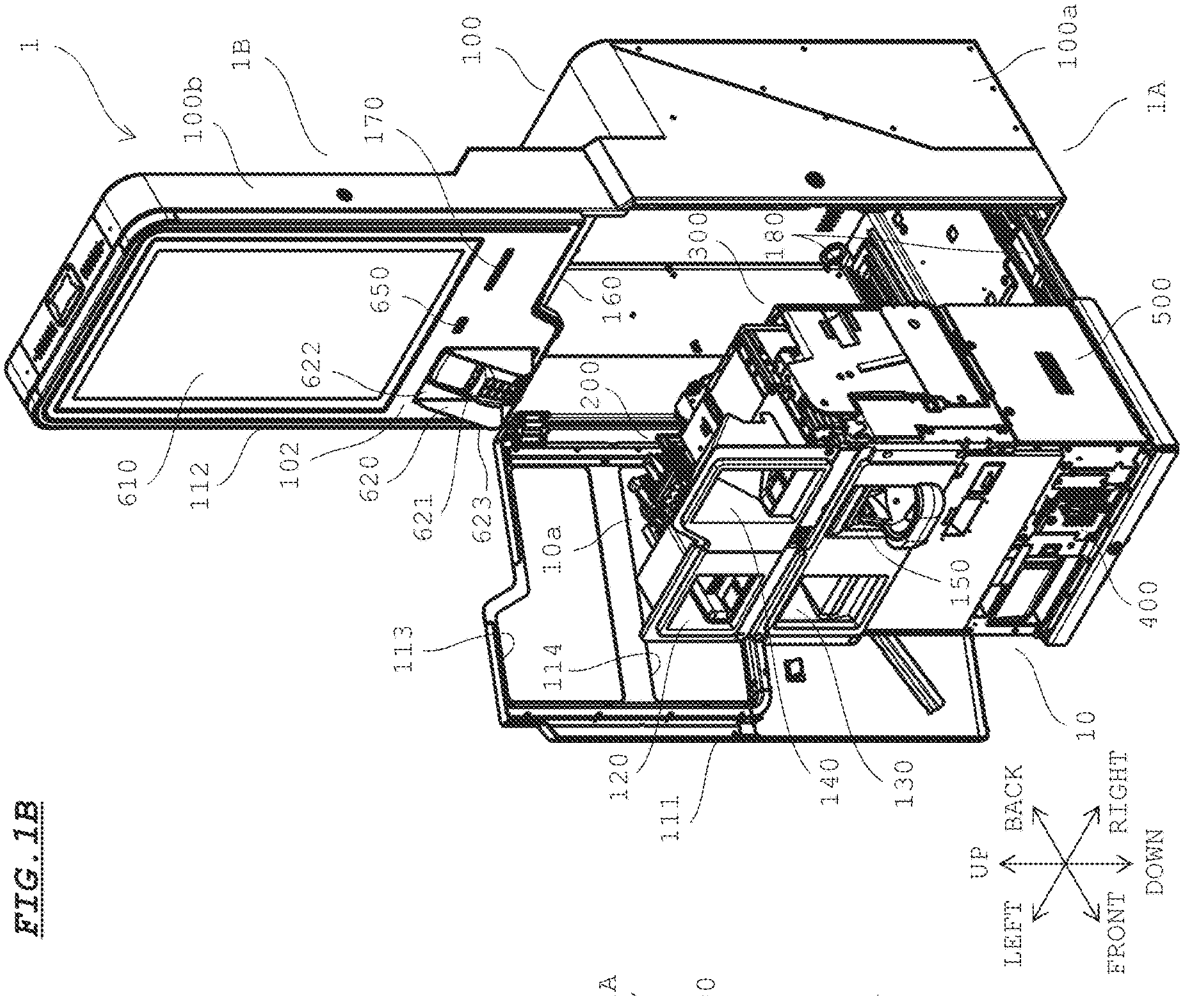
FIG. 1B is a perspective view of the automatic transaction apparatus in a state where a money handling block is pulled out from the inside of a housing, according to the embodiment.
Figure 1A:
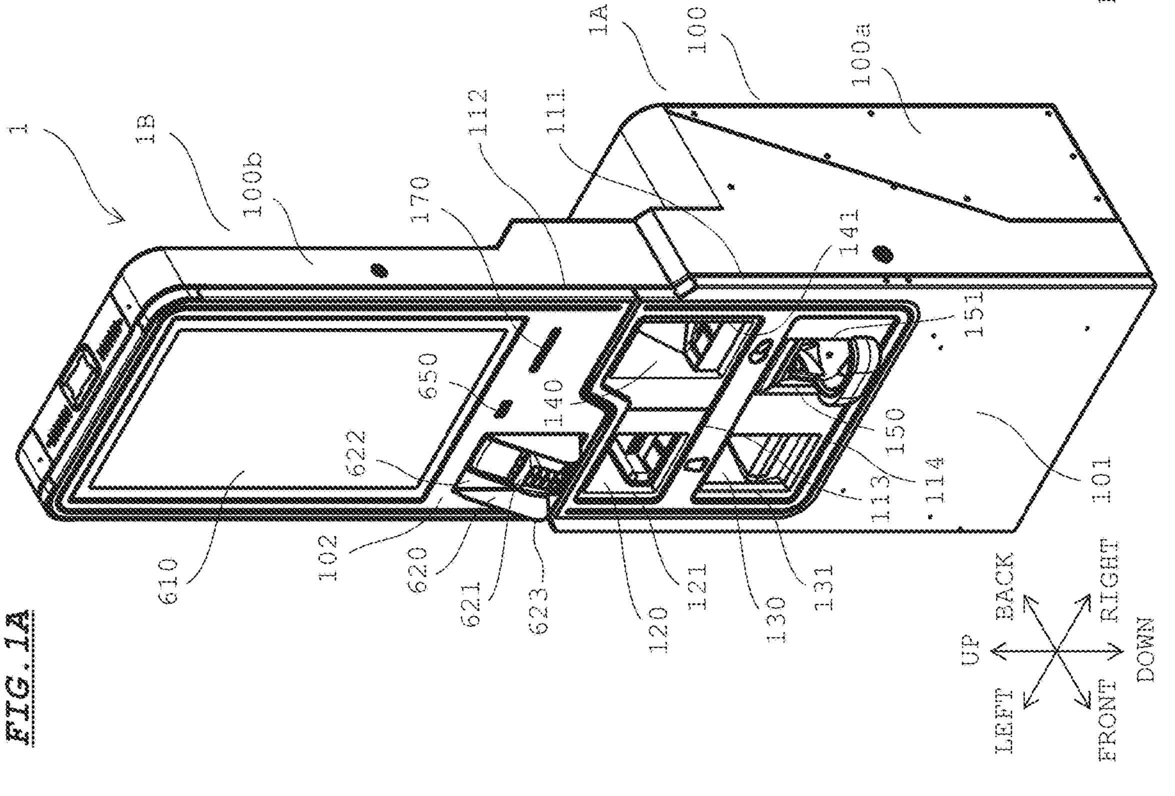
FIG. 1A is a perspective view of an automatic transaction apparatus according to an embodiment.
Figure 2B:
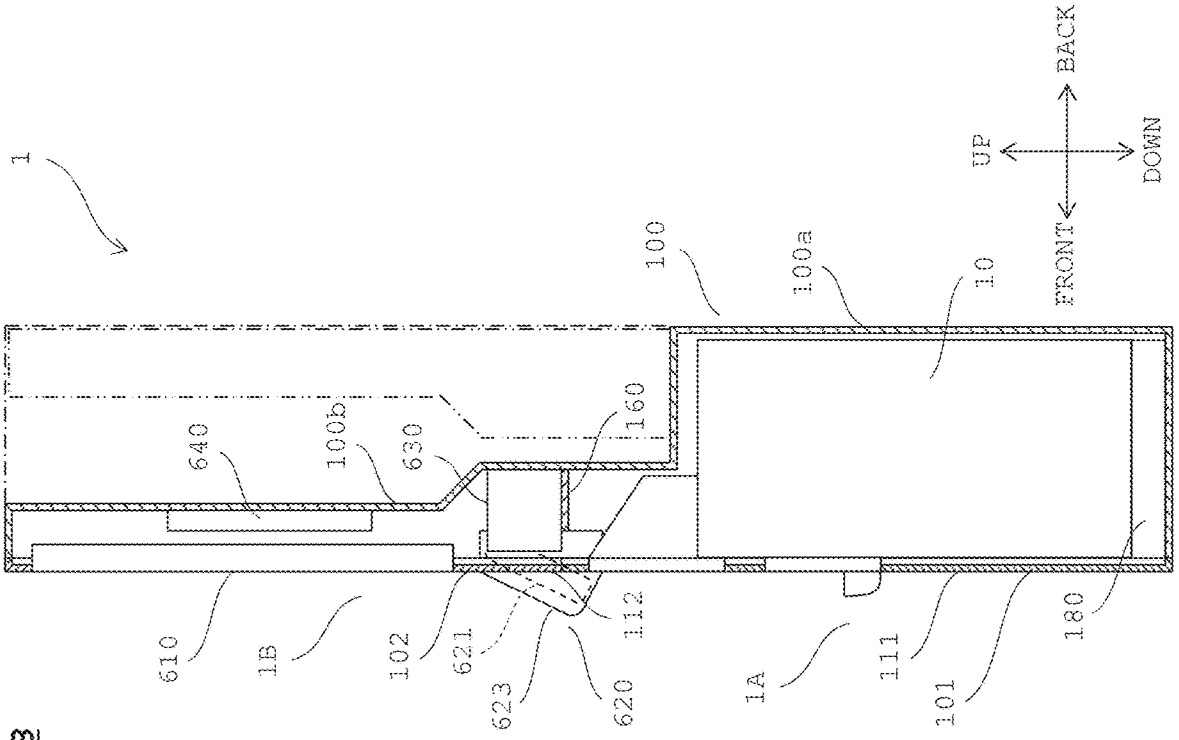
FIG. 2B is a side view showing the internal configuration of the automatic transaction apparatus with the housing depicted in cross-section, according to the embodiment.
Figure 2A:
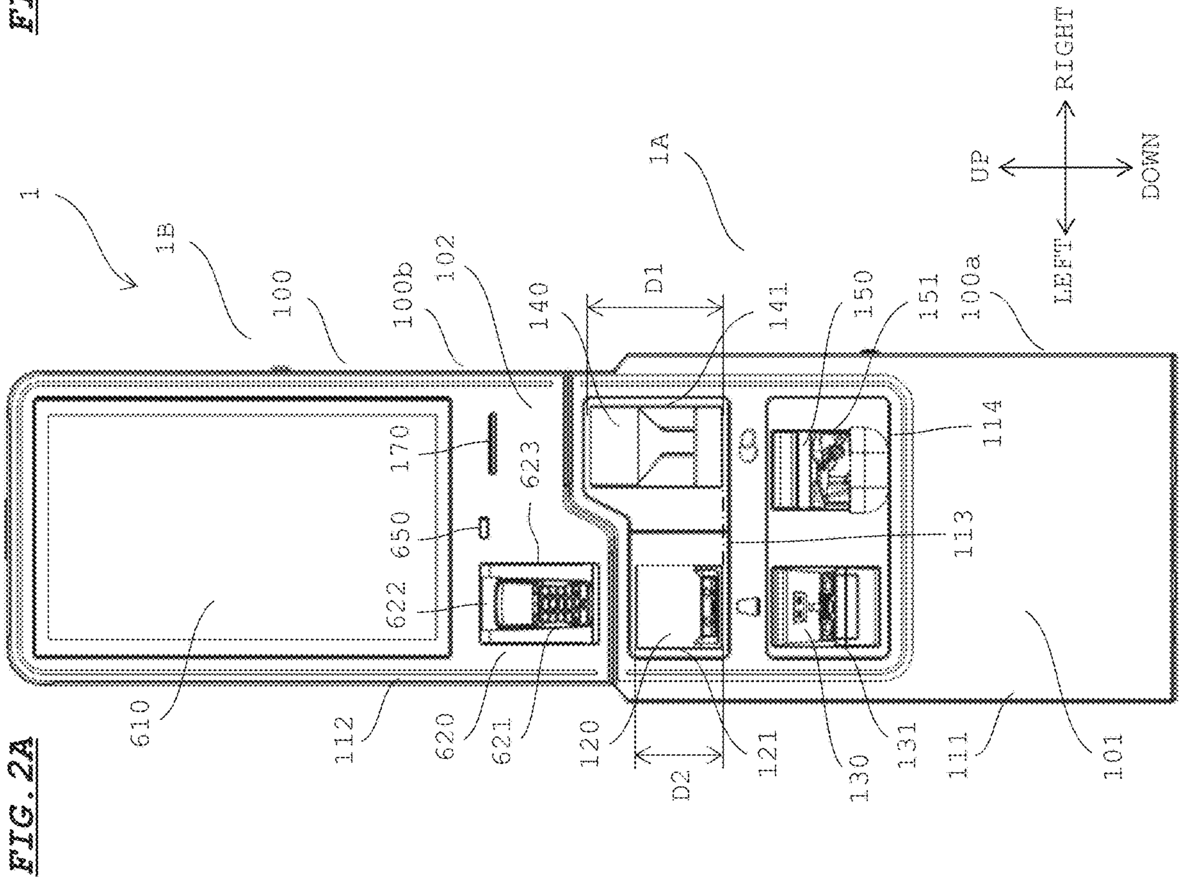
FIG. 2A is a front view of the automatic transaction apparatus according to the embodiment.

FIG. 1A is a perspective view of the automatic transaction apparatus 1, and FIG. 1B is a perspective view of the automatic transaction apparatus 1 in a state where a money handling block 10 is pulled out from the inside of a housing 100. FIG. 2A is a front view of the automatic transaction apparatus 1, and FIG. 2B is a side view showing the internal configuration of the automatic transaction apparatus 1 with the housing 100 depicted in cross-section.

The automatic transaction apparatus 1 includes the housing 100 that forms an outer shell. The housing 100 has a configuration in which a first housing 100*a* and a second housing 100*b* are integrally formed.

The first housing 100*a* has a substantially rectangular parallelepiped shape in which a dimension in a depth direction (front-back direction) is smaller than a dimension in a width direction (right-left direction). The second housing 100*b* has a substantially rectangular parallelepiped shape in which a dimension in the depth direction (front-back direction) is smaller than a dimension in the width direction (right-left direction) and which is flat in the depth direction. A lower portion of the second housing 100*b* protrudes backward more than an upper portion thereof. The depth dimension of the second housing 100*b* is made smaller than half the depth dimension of the first housing 100*a*.

The first housing 100*a* includes a first panel 111 that is a front panel that can be opened and closed. The second housing 100*b* includes a second panel 112 that is provided so as to be able to be opened and closed.

The front surface of the first housing 100*a*, that is, the front surface of the first panel 111, is a first operation surface 101. The first operation surface 101 receives insertion operations and take-out operations for banknotes and coins.

The front surface of the second housing 100*b*, that is, the surface of the second panel 112, is a second operation surface 102. The second operation surface 102 receives order operations for transaction targets and electronic settlement operations for the prices of the transaction targets. The order operations for the transaction targets are operations for giving instructions for transactions, and the electronic settlement operations for the prices of the transaction targets are electronic settlement operations for monetary amounts corresponding to the transactions.

A banknote inlet portion 120, a banknote outlet portion 130, a coin inlet portion 140, and a coin outlet portion 150 are provided in the first operation surface 101 of the first housing 100*a*. Banknotes to be deposited into a banknote handling assembly 200 are inserted into the banknote inlet portion 120. Banknotes dispensed from the banknote handling assembly 200 are discharged to the banknote outlet portion 130. Coins to be deposited into a coin handling assembly 300 are inserted into the coin inlet portion 140. Coins dispensed from the coin handling assembly 300 are discharged to the coin outlet portion 150.

The banknote inlet portion 120 is formed in a cavity shape. In addition, the banknote inlet portion 120 has a banknote inlet 121 that has a substantially quadrangular shape and is open in the first operation surface 101. The coin inlet portion 140 is formed in a cavity shape. In addition, the coin inlet portion 140 has a coin inlet 141 that has a substantially quadrangular shape and is open in the first operation surface 101.

The banknote inlet portion 120 and the coin inlet portion 140 are aligned in the right-left direction and overlap when viewed in the right-left direction, in the first operation surface 101. The lower end of the banknote inlet 121 and the lower end of the coin inlet 141 are at the same position in the up-down direction, and the height position of the banknote inlet portion 120 and the height position of the coin inlet portion 140 are the same. The coin inlet 141 has a dimension D1 in the up-down direction larger than a dimension D2 in the up-down direction of the banknote inlet 121, and extends upward more than the banknote inlet 121.

The banknote outlet portion 130 is formed in a cavity shape. In addition, the banknote outlet portion 130 has a banknote outlet 131 that has a substantially quadrangular shape and is open in the first operation surface 101. The coin outlet portion 150 is formed in a cavity shape. In addition, the coin outlet portion 150 has a coin outlet 151 that has a substantially quadrangular shape and is open in the first operation surface 101.

The banknote outlet portion 130 and the coin outlet portion 150 are aligned in the right-left direction and overlap when viewed in the right-left direction, below the banknote inlet portion 120 and the coin inlet portion 140 in the first operation surface 101. The upper end of the banknote outlet 131 and the upper end of the coin outlet 151 are at the same position in the up-down direction.

The banknote inlet portion 120 and the banknote outlet portion 130 overlap when viewed in the up-down direction, in the first operation surface 101. The center in the right-left direction of the banknote inlet portion 120 coincides with the center in the right-left direction of the banknote outlet portion 130. The coin inlet portion 140 and the coin outlet portion 150 overlap when viewed in the up-down direction, in the first operation surface 101. The center in the right-left direction of the coin inlet portion 140 is slightly shifted rightward from the center in the right-left direction of the coin outlet portion 150.

A display 610 for inputting instructions for transactions and an operation device 620 on which operations for performing electronic settlement of monetary amounts corresponding to transactions are performed are provided in the second operation surface 102 of the second housing 100*b*.

The display 610 has a quadrangular shape that is long in the up-down direction, and is provided above the banknote inlet portion 120 and the coin inlet portion 140 in the second operation surface 102. The operation device 620 is provided between: the banknote inlet portion 120 and the coin inlet portion 140; and the display 610 in the second operation surface 102.

The display 610 is a touch panel-type operation/display unit, displays a screen for ordering transaction targets, and receives operations for orders by touch on the screen. The operations for orders performed through the display 610 include operations for selecting transaction targets to be ordered and operations for selecting settlement methods (electronic settlement, cash settlement) for the prices of the ordered transaction targets. That is, the screen displayed on the display 610 includes a display (buttons, icons, etc.) for selecting a settlement method.

The operation device 620 includes a settlement terminal 621, a substantially quadrangular installation surface 622 that is recessed from the second operation surface 102, and a frame 623 that projects from the second operation surface 102 and surrounds the settlement terminal 621 installed on the installation surface 622. On the operation device 620, an operation for performing electronic settlement of the price of an ordered transaction target is performed.

The settlement terminal 621 receives operations for performing electronic settlement (cashless settlement) of prices. For electronic settlement, cards such as credit cards, debit cards, prepaid cards, and cards for electronic money settlement, and mobile terminals such as smartphones having electronic settlement apps installed therein, are used. Operations on the settlement terminal 621 include operations for reading information necessary for electronic settlement from a card or mobile terminal. The settlement terminal 621 is installed on the installation surface 622 so as to face obliquely upward in order to facilitate operations.

In the second operation surface 102, the operation device 620 overlaps the banknote inlet portion 120 when viewed in the up-down direction, and overlaps the coin inlet portion 140 when viewed in the right-left direction. That is, when viewed in the right-left direction, a lower portion of the operation device 620 overlaps a portion, of the coin inlet portion 140, extending upward more than the banknote inlet portion 120.

A printer 630 and a control assembly 640 are provided inside the second housing 100*b*. The printer 630 is installed on an installation plate 160 provided within the second housing 100*b*. The control assembly 640 is installed on the back surface of the second housing 100*b*.

The printer 630 prints a receipt related to a transaction (order of a transaction target). A discharge port 170 to which a receipt printed by the printer 630 is discharged is placed in the second operation surface 102 and aligned with the operation device 620 in the right-left direction so as to overlap the operation device 620 when viewed in the right-left direction.

The control assembly 640 includes a control board on which a control circuit is mounted, and controls the display 610, the settlement terminal 621 of the operation device 620, and the printer 630.

Furthermore, a human sensor 650 is provided between the operation device 620 and the discharge port 170 in the second operation surface 102. The human sensor 650 is, for example, an infrared sensor, detects a person facing the front of the first operation surface 101 and the second operation surface 102, and transmits a detection signal to the control assembly 640.

The first panel 111, that is, the first operation surface 101, and the second panel 112, that is, the second operation surface 102, can be opened and closed separately. The boundary between the first operation surface 101 and the second operation surface 102 has a stepped shape in which the banknote inlet portion 120 side thereof is lower and the coin inlet portion 140 side thereof is higher.

A depositing opening 113 and a dispensing opening 114 are provided in the first operation surface 101. The banknote inlet portion 120 and the coin inlet portion 140 are provided within the depositing opening 113. The banknote outlet portion 130 and the coin outlet portion 150 are provided within the dispensing opening 114. The upper end of the depositing opening 113 has a stepped shape in which the banknote inlet portion 120 side thereof is lower and the coin inlet portion 140 side thereof is higher.

The second operation surface 102 is flush with the first operation surface 101. Furthermore, in the right-left direction of the first operation surface 101 and the second operation surface 102, the operation device 620, the discharge port 170, the banknote inlet portion 120, the banknote outlet portion 130, the coin inlet portion 140, and the coin outlet portion 150 are contained within the width in the right-left direction of the display 610.

The first operation surface 101 and the second operation surface 102 are perpendicular to the bottom surface of the first housing 100*a*, and are perpendicular to a floor surface on which the automatic transaction apparatus 1 is installed. A configuration in which at least one of the first operation surface 101 and the second operation surface 102 is inclined with respect to the bottom surface of the first housing 100*a* and the floor surface, may be adopted.

The banknote handling assembly 200, the coin handling assembly 300, a power supply assembly 400, and a control assembly 500 are provided inside the first housing 100*a*.

The banknote handling assembly 200 handles banknotes. More specifically, the banknote handling assembly 200 performs a depositing process on banknotes inserted into the banknote inlet portion 120 for the price of an ordered transaction target, that is, counts and stores the banknotes. In addition, as a dispensing process, the banknote handling assembly 200 discharges banknotes that are change, to the banknote outlet portion 130. The coin handling assembly 300 handles coins. More specifically, the coin handling assembly 300 performs a depositing process on coins inserted into the coin inlet portion 140 for the price of an ordered transaction target, that is, counts and stores the coins. In addition, as a dispensing process, the coin handling assembly 300 discharges coins that are change, to the coin outlet portion 150.

The power supply assembly 400 supplies power to both the banknote handling assembly 200 and the coin handling assembly 300.

The control assembly 500 includes a control board on which a control circuit is mounted, and controls the functions and operations of the parts constituting the banknote handling assembly 200 and the coin handling assembly 300. The control assembly 500 is communicably connected to the control assembly 640 via a communication interface. The control assembly 500 can control each part based on operations performed for each part, information received via the communication interface, etc., while referring to various kinds of information stored in a memory. For example, a program corresponding to the control assembly 500 is stored in the memory in advance, and the functions and operations of the control assembly 500 are realized by hardware such as a CPU executing this program, whereby the functions and operations of the banknote handling assembly 200 and the coin handling assembly 300 of the present embodiment are realized. According to an exemplary embodiment, the control assembly 500 includes, for example, one or more general-purpose processing circuits such as a microprocessor, a microcontroller, and a digital signal processor, or a dedicated processing circuit such as an ASIC (application-specific integrated circuit).

The banknote handling assembly 200, the coin handling assembly 300, the power supply assembly 400, and the control assembly 500 are integrated to constitute the money handling block 10. Within the money handling block 10, the banknote handling assembly 200 and the coin handling assembly 300 can be collectively referred to as money handling assembly 10*a*.

The money handling block 10 is installed on a pair of drawer rails 180 within the first housing 100*a*. As shown in FIG. 1A, the money handling block 10 can be pulled from the inside of the first housing 100*a* to the outside by opening the first panel 111.

Figure 3B:
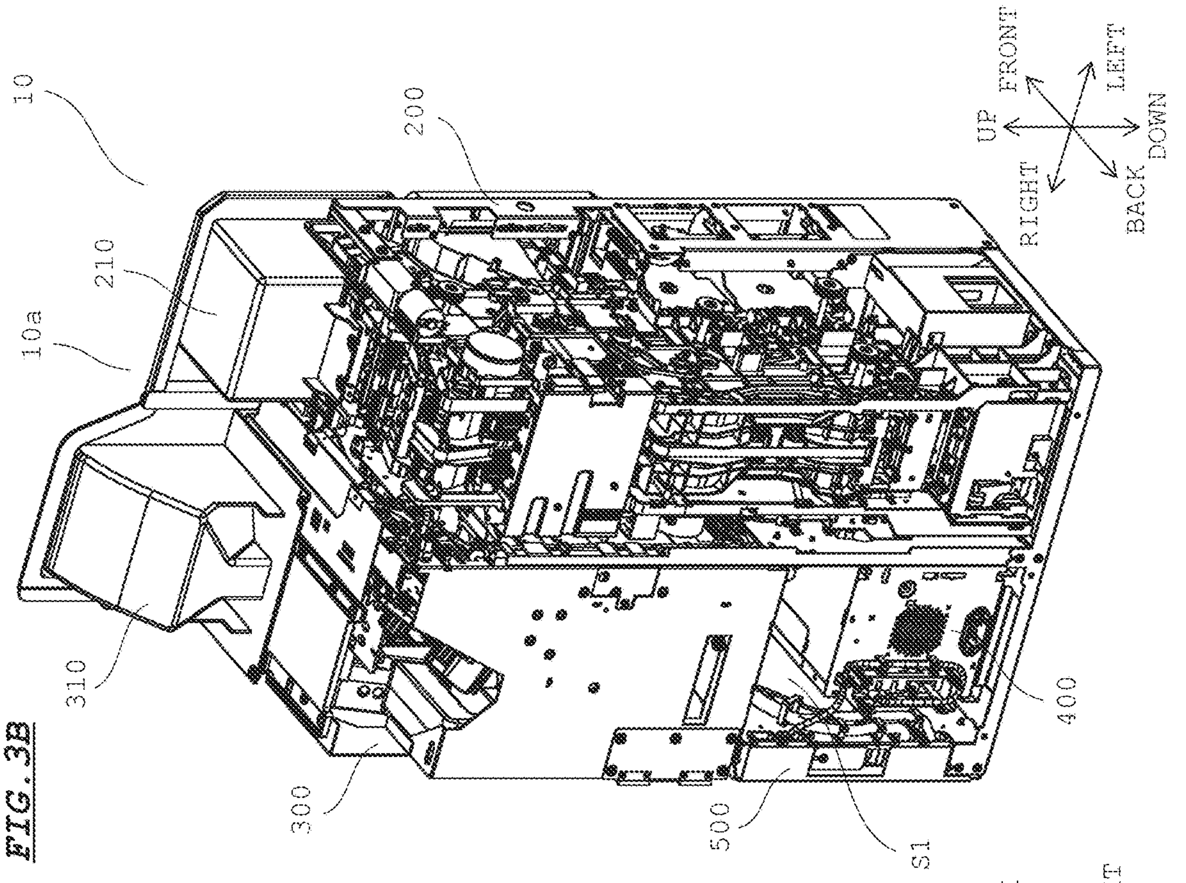
FIG. 3B is a back perspective view of the money handling block according to the embodiment.
Figure 3A:
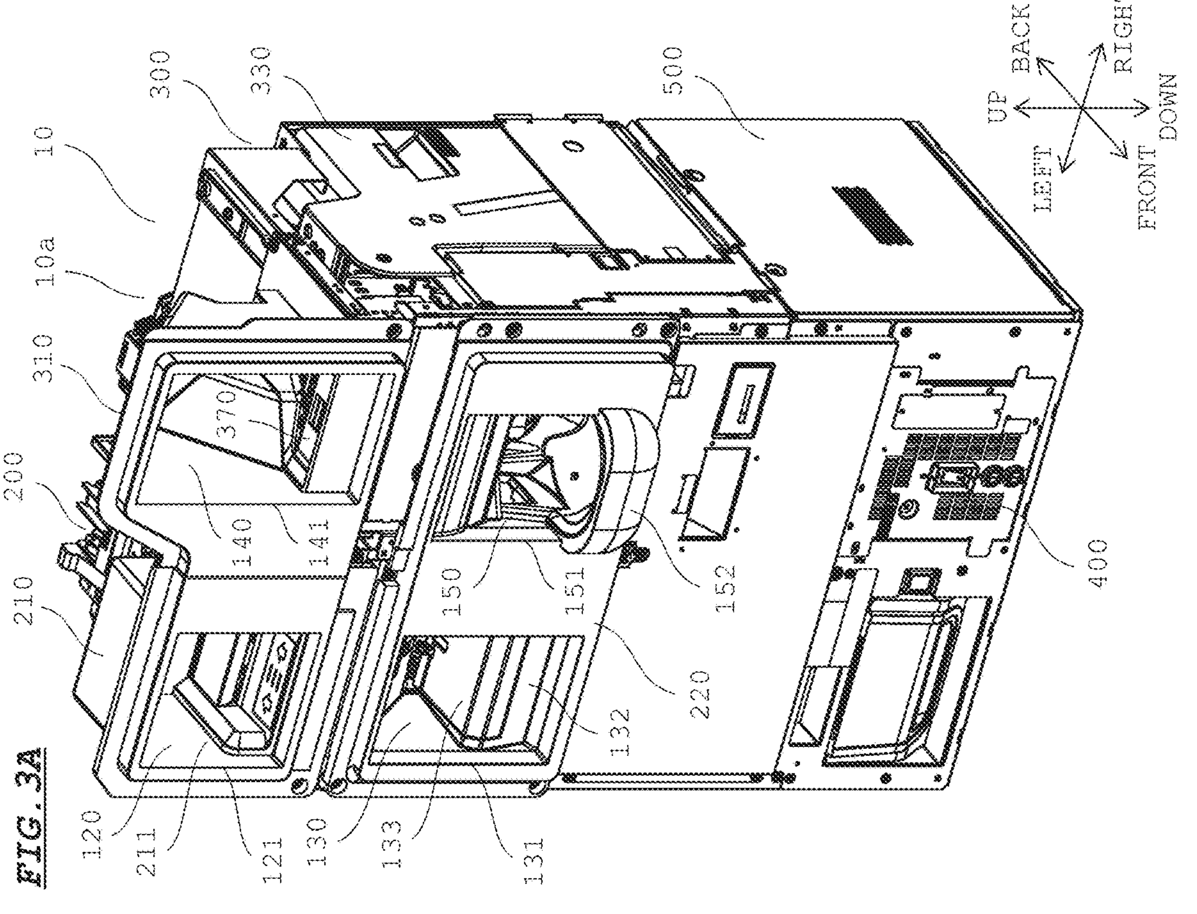
FIG. 3A is a front perspective view of the money handling block according to the embodiment.

FIG. 3A is a front perspective view of the money handling block 10, and FIG. 3B is a back perspective view of the money handling block 10.

Within the first housing 100*a*, the banknote handling assembly 200 and the coin handling assembly 300 each have an outer shape close to a rectangular parallelepiped that is long in the front-back direction, and are arranged in the direction in which the banknote inlet portion 120 and the coin inlet portion 140 are aligned, that is, in the right-left direction. The dimension in the up-down direction of the banknote handling assembly 200 is made larger than the dimension in the up-down direction of the coin handling assembly 300. The banknote handling assembly 200 and the coin handling assembly 300 are placed such that upper end portions thereof are at the same height, and the lower end of the coin handling assembly 300 is positioned higher than the lower end of the banknote handling assembly 200.

A banknote inlet member 210 having the banknote inlet portion 120 is placed at an upper portion on the front side of the banknote handling assembly 200. Accordingly, the banknote inlet portion 120 is located at the upper portion of the banknote handling assembly 200. In addition, a coin inlet member 310 having the coin inlet portion 140 is placed at an upper portion on the front side of the coin handling assembly 300. Accordingly, the coin inlet portion 140 is located at the upper portion of the coin handling assembly 300. Furthermore, in the banknote handling assembly 200 and the coin handling assembly 300, an outlet member 220 having the banknote outlet portion 130 and the coin outlet portion 150 is placed below the banknote inlet member 210 and the coin inlet member 310.

The power supply assembly 400 has a rectangular parallelepiped shape that is long in the front-back direction, and is placed below the coin handling assembly 300 within the first housing 100*a*. The control assembly 500 has a substantially rectangular parallelepiped shape that is flat in the right-left direction, and is placed below the coin handling assembly 300 within the first housing 100*a* so as to be adjacent to the side, of the power supply assembly 400, opposite to the banknote handling assembly 200 side.

By placing the coin handling assembly 300, which has a smaller dimension in the up-down direction than the banknote handling assembly 200, at such a height that the coin inlet portion 140 overlaps the banknote inlet portion 120 when viewed in the right-left direction, a space S1 is formed below the coin handling assembly 300 and next to the banknote handling assembly 200 within the first housing 100*a*. This space S1 is used for the placement of the power supply assembly 400 and the control assembly 500.

Portions of the banknote inlet member 210 and the coin inlet member 310, that is, portions of the banknote inlet portion 120 and the coin inlet portion 140, protrude upward from the first housing 100*a* and are housed in the second housing 100*b*. Furthermore, the first panel 111, that is, the first operation surface 101, also extends upward more than the first housing 100*a* and protrudes to the second housing 100*b* side. The second operation surface 102 is shortened in the up-down direction by the amount in which the first operation surface 101 protrudes to the second housing 100*b* side.

A gap space is provided between the lower end of the coin handling assembly 300 and the upper end of the power supply assembly 400. If a coin storage container is added to the coin handling assembly 300, this storage container can be placed in the gap space.

The money handling apparatus 1A is composed of the first housing 100*a*, the banknote handling assembly 200, the coin handling assembly 300, the power supply assembly 400, and the control assembly 500. In addition, the operation display apparatus 1B is composed of the second housing 100*b*, the display 610, the operation device 620, the printer 630, and the control assembly 640. The automatic transaction apparatus 1 has a configuration in which the operation display apparatus 1B is placed on the money handling apparatus 1A.

Figure 4B:
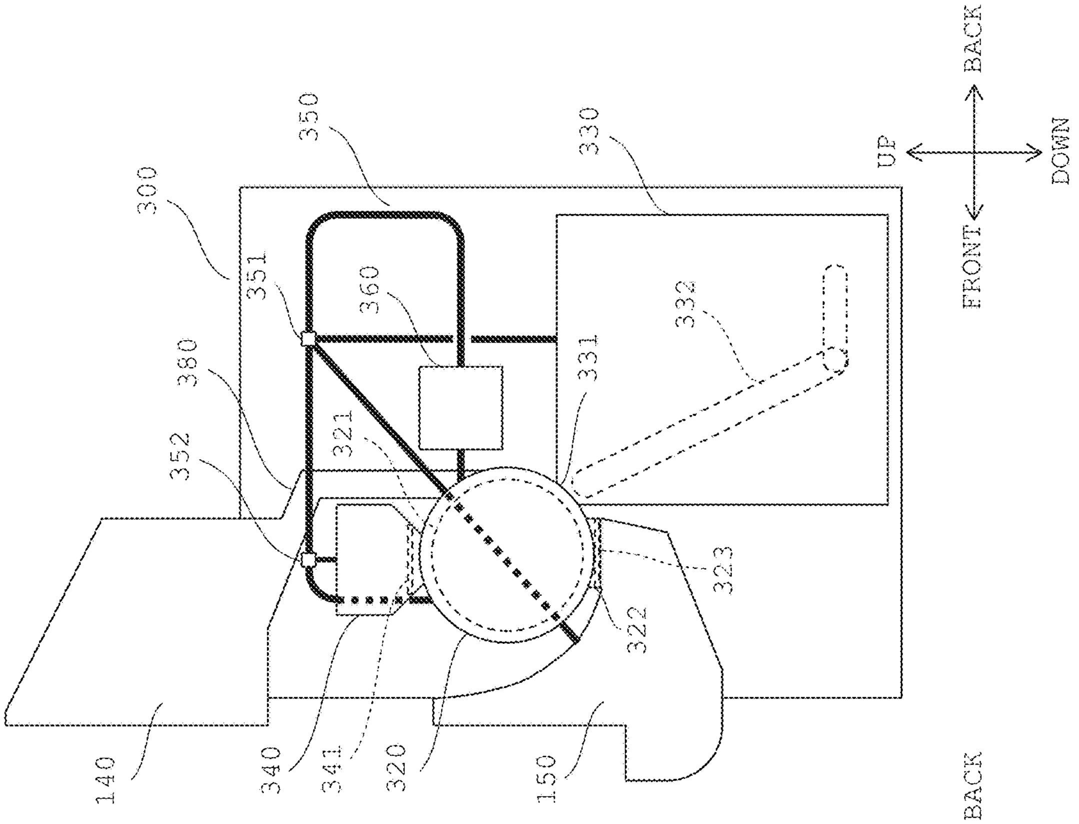
FIG. 4B shows a schematic configuration of a coin handling assembly according to the embodiment.
Figure 4A:
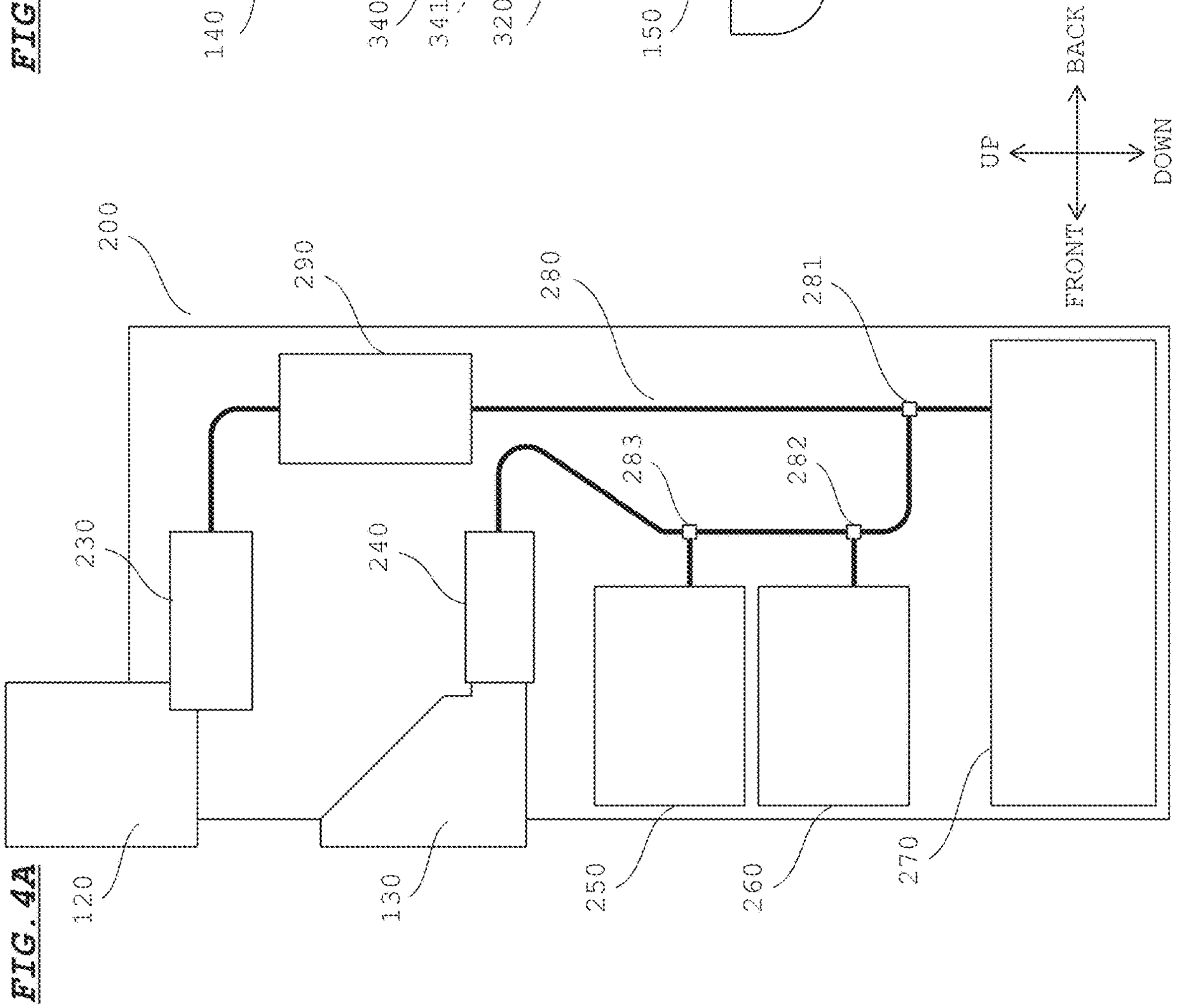
FIG. 4A shows a schematic configuration of a banknote handling assembly according to the embodiment.

FIG. 4A shows a schematic configuration of the banknote handling assembly 200. FIG. 4A shows the banknote handling assembly 200 as viewed from the right side.

The banknote handling assembly 200 includes a banknote taking-in unit 230, a banknote discharge mechanism 240, a first banknote storage container 250, a second banknote storage container 260, a banknote collection container 270, a banknote transport unit 280, and a banknote recognition unit 290.

The banknote taking-in unit 230 is placed behind the banknote inlet portion 120. The banknote taking-in unit 230 has a taking-in mechanism, takes banknotes inserted into the banknote inlet portion 120 one by one therein, and sends the banknotes to the banknote transport unit 280.

The banknote discharge mechanism 240 is placed behind the banknote outlet portion 130. The banknote discharge mechanism 240 includes a stacking wheel made of rubber, etc., and discharges banknotes sent from the banknote transport unit 280, to the banknote outlet portion 130.

The first banknote storage container 250 and the second banknote storage container 260 are placed below the banknote outlet portion 130 and the banknote discharge mechanism 240 so as to be aligned in the up-down direction. The first banknote storage container 250 and the second banknote storage container 260 each include a feeding mechanism, and can feed out banknotes stored therein to the banknote transport unit 280. Banknotes of lower denominations to be dispensed as change are stored for each denomination in the first banknote storage container 250 and the second banknote storage container 260. For example, 1-dollar notes are stored in the first banknote storage container 250, and 5-dollar notes are stored in the second banknote storage container 260.

The banknote collection container 270 is placed below the first banknote storage container 250 and the second banknote storage container 260. The banknote collection container 270 is longer in the front-back direction than the first banknote storage container 250 and the second banknote storage container 260. Banknotes of higher denominations that are not dispensed as change, such as banknotes of 10 dollars or more, are stored (collected) in the banknote collection container 270. Furthermore, banknotes that cannot be stored in the first banknote storage container 250 and the second banknote storage container 260 are stored (collected) in the banknote collection container 270. The banknotes stored in the banknote collection container 270 can be taken out from the banknote collection container 270 by pulling out the banknote collection container 270 frontward.

The banknote transport unit 280 is placed behind the banknote taking-in unit 230, the banknote discharge mechanism 240, the first banknote storage container 250, and the second banknote storage container 260. The banknote transport unit 280 is arranged between the banknote taking-in unit 230, the banknote discharge mechanism 240, the first banknote storage container 250, the second banknote storage container 260, and the banknote collection container 270, and transports banknotes therebetween. The banknote transport unit 280 includes a transport mechanism composed of a plurality of rollers, a plurality of belts, etc.

The banknote transport unit 280 is provided with a first diversion mechanism 281, a second diversion mechanism 282, and a third diversion mechanism 283. The first diversion mechanism 281 can, for example, divert banknotes flowing in the banknote transport unit 280 from the banknote inlet portion 120 side toward the banknote outlet portion 130 side, to the banknote collection container 270 side. The second diversion mechanism 282 can, for example, divert banknotes flowing in the banknote transport unit 280 from the banknote inlet portion 120 side toward the banknote outlet portion 130 side, to the second banknote storage container 260 side. The third diversion mechanism 283 can, for example, divert banknotes flowing in the banknote transport unit 280 from the banknote inlet portion 120 side toward the banknote outlet portion 130 side, to the first banknote storage container 250 side.

The banknote recognition unit 290 is provided on the banknote taking-in unit 230 side with respect to the first diversion mechanism 281 in the banknote transport unit 280. The banknote recognition unit 290 recognizes the attributes of banknotes flowing in the banknote transport unit 280, and outputs the recognition result. The attributes to be recognized include the authenticity, denomination, fitness, etc., of each banknote. The first diversion mechanism 281, the second diversion mechanism 282, and the third diversion mechanism 283 operate in accordance with the recognition result of the banknote recognition unit 290. Furthermore, the banknote recognition unit 290 also counts the banknotes. The banknote recognition unit 290 is composed of, for example, a sensor such as an optical sensor or a magnetic sensor.

FIG. 4B shows a schematic configuration of the coin handling assembly 300. FIG. 4B shows the coin handling assembly 300 as viewed from the right side.

The coin handling assembly 300 includes a coin feeding unit 320, a coin storage container 330, a coin temporary storage portion 340, a coin transport unit 350, and a coin recognition unit 360.

The coin feeding unit 320 is placed below the coin inlet portion 140. Coins inserted into the coin inlet portion 140 are introduced into the coin feeding unit 320 via a chute 380. The coin feeding unit 320 has a feeding disc 321, and feeds out coins one by one to the coin transport unit 350 by rotating the feeding disc 321. Furthermore, a discharge port 322 is provided in a bottom portion of the coin feeding unit 320 so as to be connected to the coin outlet portion 150. The discharge port 322 is closed by a shutter 323. If deformed coins or foreign objects remain in the coin feeding unit 320, the shutter 323 is opened, and these coins or objects are discharged to the coin outlet portion 150.

The coin storage container 330 is placed below the coin feeding unit 320 and the coin transport unit 350. Coins are stored in the coin storage container 330 in a state where the denominations thereof are mixed. The coin storage container 330 has a coin discharge port 331 connected to the coin feeding unit 320, and a transport mechanism 332 composed of a conveyor, etc. The coins stored in the coin storage container 330 are transported by the transport mechanism 332 and discharged into the coin feeding unit 320 via the discharge port 331.

The coin temporary storage portion 340 is placed below the coin feeding unit 320. Coins transported from the coin transport unit 350 are temporarily stored in the coin temporary storage portion 340. A shutter 341 is provided at a bottom portion of the coin temporary storage portion 340, and when the shutter 341 opens, the coins in the coin temporary storage portion 340 fall into the coin feeding unit 320.

The coin transport unit 350 is arranged between the coin feeding unit 320, the coin storage container 330, the coin temporary storage portion 340, and the coin outlet portion 150, and transports coins therebetween. The coin transport unit 350 includes a transport mechanism composed of a plurality of rollers, belts, etc.

The coin transport unit 350 is provided with a first diversion mechanism 351 and a second diversion mechanism 352. The first diversion mechanism 351 can divert coins flowing in the coin transport unit 350, to the coin storage container 330 side or the coin outlet portion 150 side. The second diversion mechanism 352 can divert coins flowing in the coin transport unit 350, to the coin temporary storage portion 340 side.

The coin recognition unit 360 is provided on the coin feeding unit 320 side with respect to the first diversion mechanism 351 in the coin transport unit 350. The coin recognition unit 360 recognizes the attributes of coins flowing in the coin transport unit 350, and outputs the recognition result. The attributes to be recognized include the authenticity, denomination, fitness, etc., of each coin. The first diversion mechanism 351 and the second diversion mechanism 352 operate in accordance with the recognition result of the coin recognition unit 360. Furthermore, the coin recognition unit 360 also counts the coins. The coin recognition unit 360 is composed of, for example, a sensor such as an optical sensor or a magnetic sensor.

As shown in FIG. 3A, in the coin handling assembly 300, the coin storage container 330 is placed on the surface side opposite to the surface adjacent to the banknote handling assembly 200. With the above configuration, the coin storage container 330 can be easily accessed in a state where the banknote handling assembly 200 and the coin handling assembly 300 are pulled out of the first housing 100$a$. Accordingly, the coin storage container 330 can be easily detached when manual coin replenishment or collection is required, for example, when the coin handling assembly 300 is not operating normally.

The banknote handling assembly 200 has a configuration in which the first banknote storage container 250, the second banknote storage container 260, and the banknote collection container 270, that is, a plurality of banknote storage units, are arranged in the up-down direction rather than the front-back direction. Accordingly, the banknote handling assembly 200 is made compact in size in the front-back direction. Furthermore, the coin handling assembly 300 has only one coin storage container 330. Accordingly, the coin handling assembly 300 is made compact in size in the front-back direction. As described above, the banknote handling assembly 200 and the coin handling assembly 300 are made compact in size in the direction (front-back direction) orthogonal to the direction in which the banknote handling assembly 200 and the coin handling assembly 300 are aligned. Accordingly, the automatic transaction apparatus 1 that is thin in the direction orthogonal to the direction in which the banknote handling assembly 200 and the coin handling assembly 300 are aligned, that is, in the depth direction, can be realized.

In the store, the automatic transaction apparatus 1 is often installed such that the back surface thereof, which is the surface opposite to the first operation surface 101, is close to a wall surface of the store. In such a case, since the automatic transaction apparatus 1 is thin in the depth direction, the amount of protrusion of the automatic transaction apparatus 1 from the wall surface of the store can be reduced.

Figure 5B:
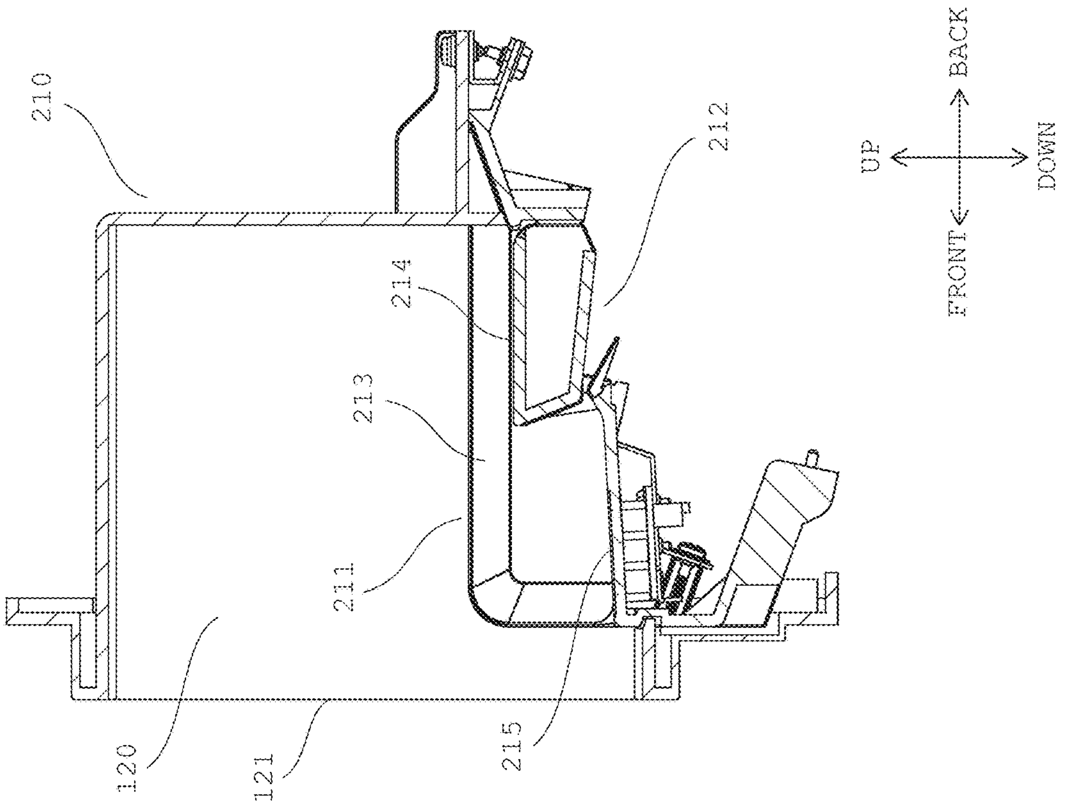
FIGS. 5A and 5B are respectively a perspective view and a longitudinal cross-sectional view of a banknote inlet member having a banknote inlet portion according to the embodiment.
Figure 5A:
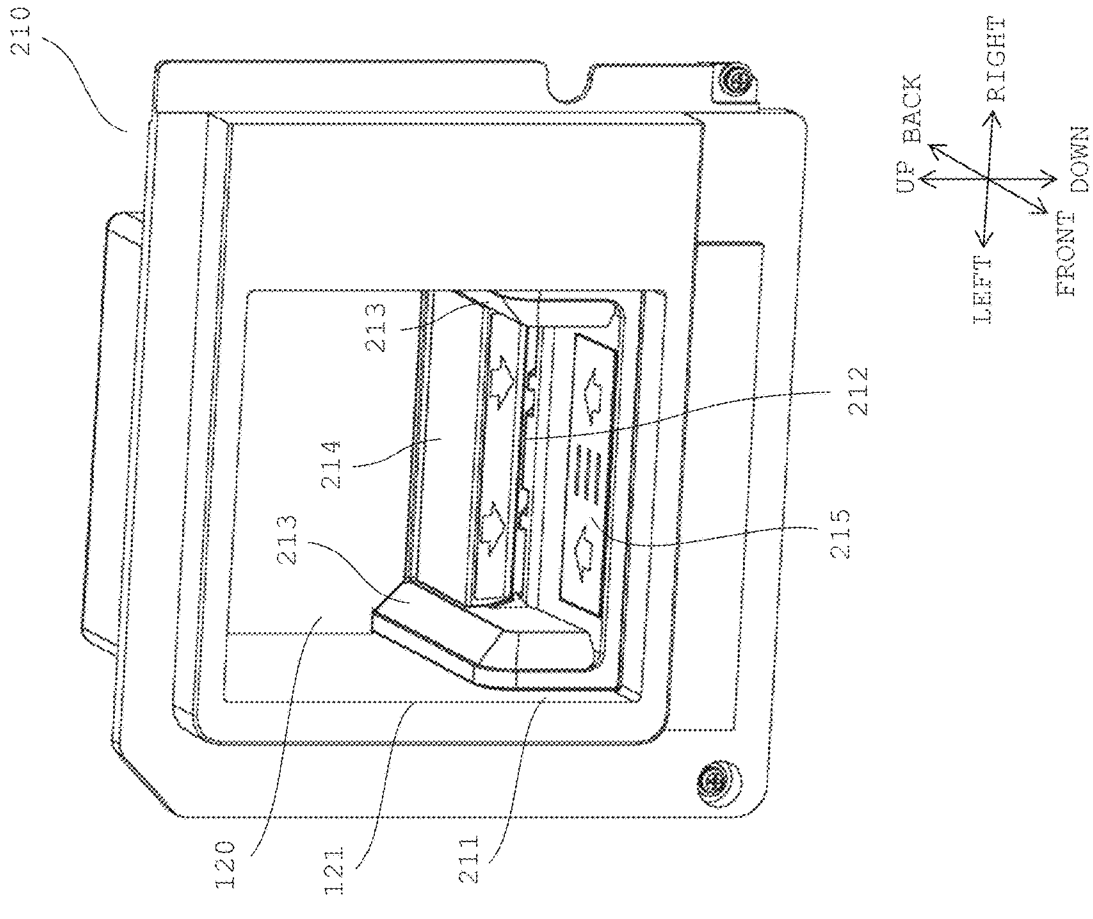

FIGS. 5A and 5B are respectively a perspective view and a longitudinal cross-sectional view of the banknote inlet member 210 having the banknote inlet portion 120.

In the banknote inlet member 210, a banknote insertion table 211 that can receive a plurality of banknotes is provided at a bottom portion of the banknote inlet portion 120. The banknote insertion table 211 has an inlet 212 that is open in a horizontally long substantially quadrangular shape, in a back portion thereof, and a pair of guides 213 are formed on both sides of the inlet 212 so as to extend frontward. A lid portion 214 is provided at the inlet 212 so as to be able to be opened and closed vertically.

Furthermore, a quadrangular display board 215 with arrow marks is placed on the front side of the banknote insertion table 211 at the bottom portion of the banknote inlet portion 120. When a banknote is to be inserted into the banknote inlet portion 120, an LED provided on the display board 215 lights up.

A banknote to be inserted is placed on the banknote insertion table 211 such that the face and back thereof face in the up-down direction, is moved to the back side, and is inserted into the inlet 212. At this time, both ends of the banknote are guided by the pair of guides 213. When the lid portion 214 is closed, a gap is formed between the lid portion 214 and the inlet 212, and the banknote can be inserted into this gap. When more banknotes are to be inserted, the lid portion 214 can be opened manually. The banknotes inserted into the inlet 212 are taken into the banknote handling assembly 200 by the operation of the banknote taking-in unit 230. The dimension in the up-down direction of the banknote inlet portion 120 is set to a size that allows the lid portion 214 to be fully opened.

Figure 6:
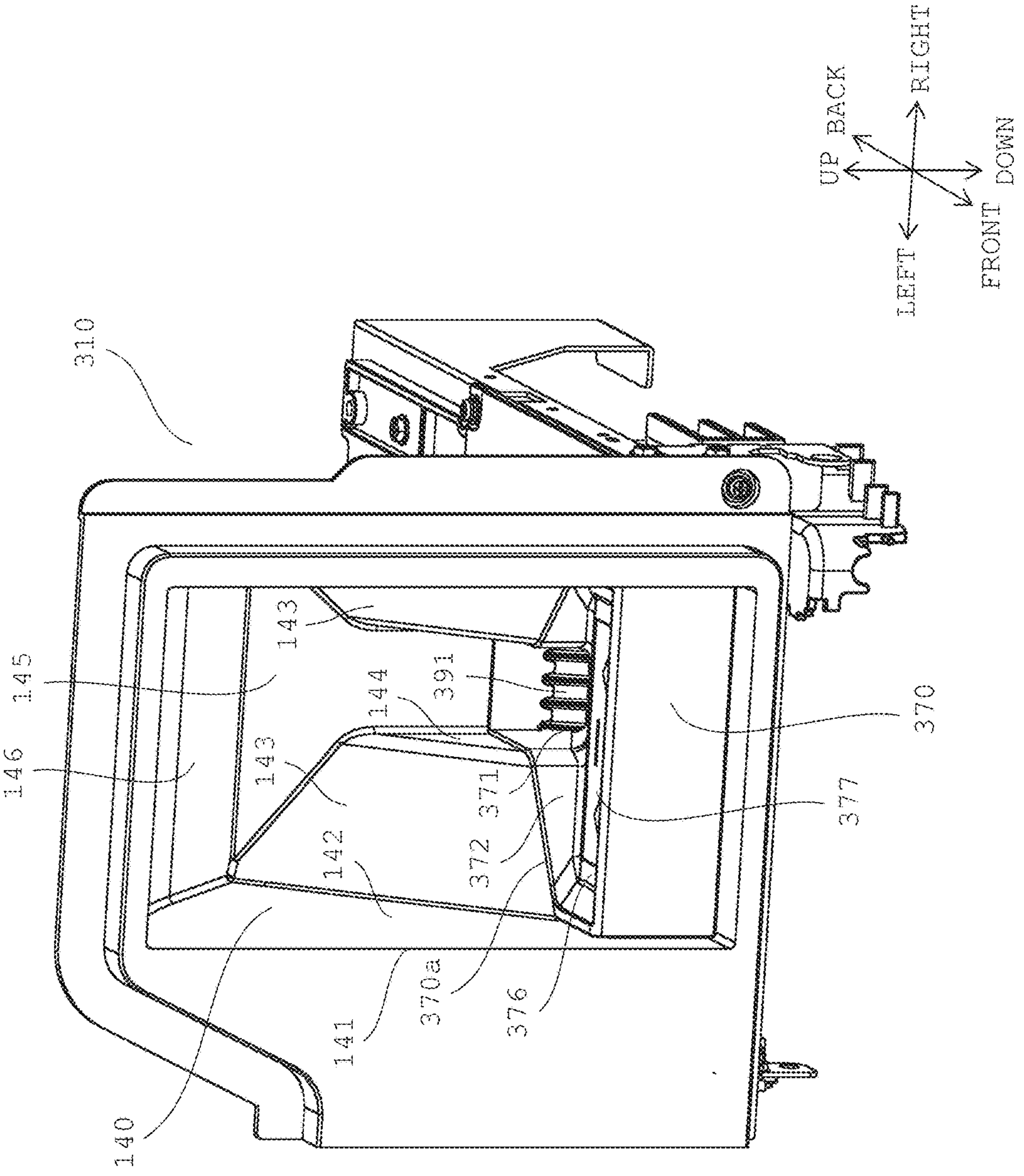
FIG. 6 is a perspective view of a coin inlet member having a coin inlet portion and components therearound according to the embodiment.
Figure 7B:
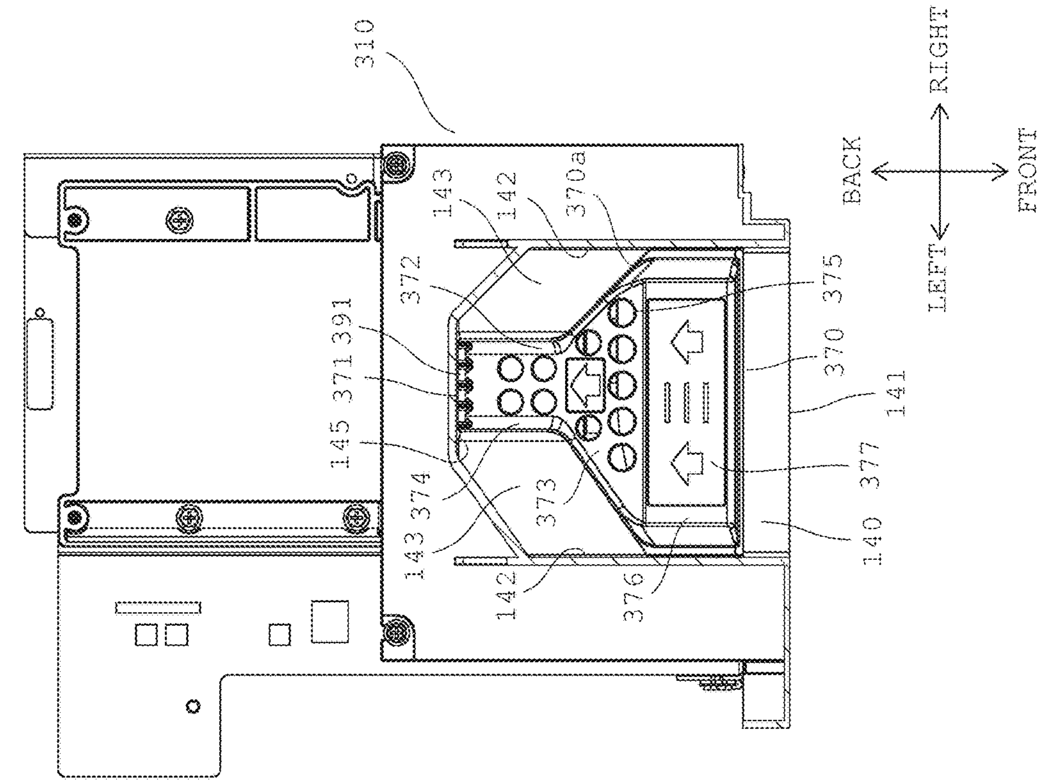
FIGS. 7A and 7B are respectively a longitudinal cross-sectional view and a transverse cross-sectional view of the coin inlet member having the coin inlet portion and the components therearound according to the embodiment.
Figure 7A:
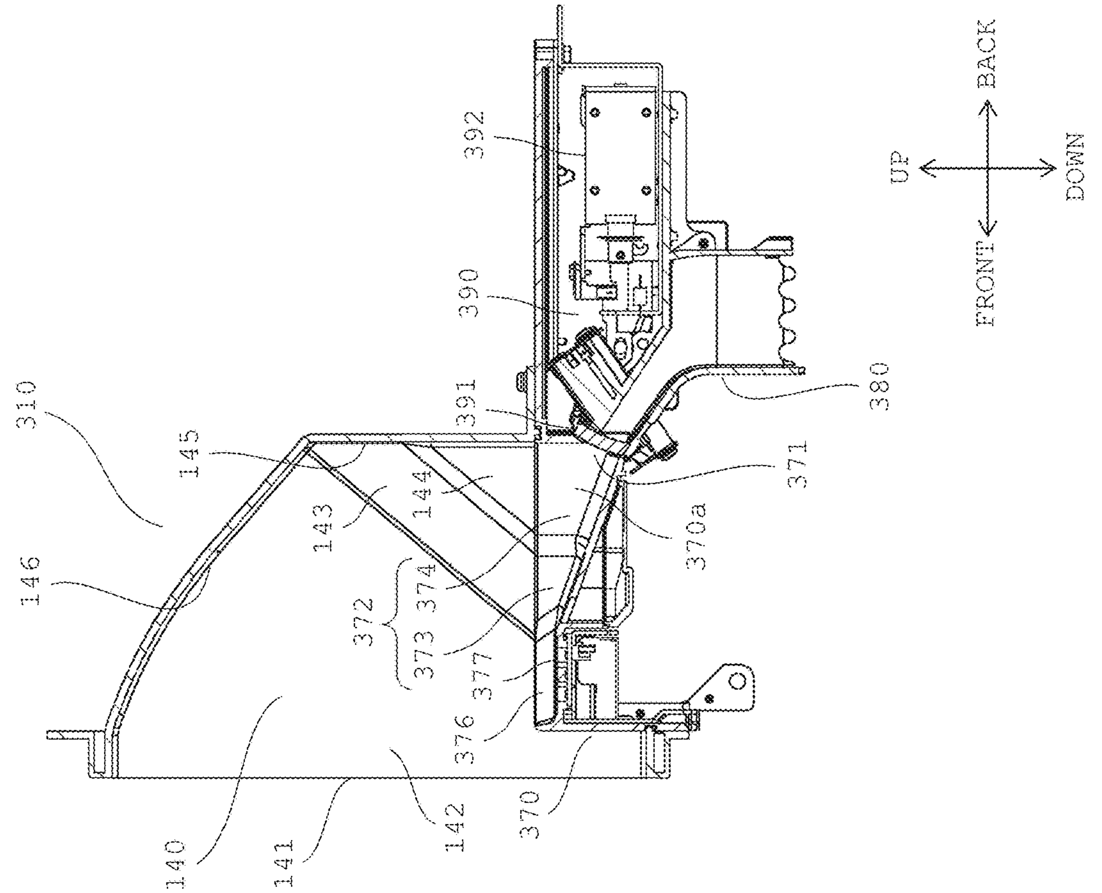

FIG. 6 is a perspective view of the coin inlet member 310 having the coin inlet portion 140 and components therearound. FIGS. 7A and 7B are respectively a longitudinal cross-sectional view and a transverse cross-sectional view of the coin inlet member 310 having the coin inlet portion 140 and the components therearound.

In the coin inlet member 310, a coin reception portion 370 having concave shape that can receive a plurality of coins is provided at a bottom portion of the coin inlet portion 140. In an interior 370$a$ of the coin reception portion 370, a taking-in port 371 is provided at a back end, which is an end portion opposite to the coin inlet 141 side, so as to be open in a substantially quadrangular shape. Coins inserted into the coin reception portion 370 are taken into the interior of the coin handling assembly 300 through the taking-in port 371.

In the interior 370$a$ of the coin reception portion 370, a passage 372 that has a sloping bottom surface sloping down toward the taking-in port 371 side and in which coins flow toward the taking-in port 371, is provided. The passage 372 includes a first passage 373 that has an entrance width wider than the width of the taking-in port 371 and has a width gradually narrowing toward the taking-in port 371 side, and a second passage 374 that extends from the exit of the first passage 373 to the taking-in port 371 with a substantially constant width. A plurality of circular holes 375 are formed in the bottom surface of the passage 372. Small foreign objects inserted together with coins are discharged from the holes 375, making it difficult for the foreign objects to enter through the taking-in port 371.

In the interior 370$a$ of the coin reception portion 370, a front coin reception portion 376 on the front side, that is, the coin inlet 141 side, with respect to the passage 372, has a width equal to that of the entrance of the first passage 373 and has a horizontal bottom surface. A quadrangular display board 377 with arrow marks is placed on the bottom surface of the front coin reception portion 376. When a coin is to be inserted into the coin inlet portion 140, an LED provided on the display board 377 lights up. Since the display board 377 is placed on the horizontal surface, it is easy for the user to see the display board 377.

The coin inlet portion 140 has first side wall surfaces 142 located on the right and left sides of the front coin reception portion 376 of the coin reception portion 370, second side wall surfaces 143 located on the right and left sides of the first passage 373 of the coin reception portion 370, third side wall surfaces 144 located on the right and left sides of the second passage 374 of the coin reception portion 370, a back wall surface 145, and a top wall surface 146.

The right and left second side wall surfaces 143 are inclined toward the back side, that is, toward the back side of the coin inlet portion 140. Accordingly, the space above the coin reception portion 370 can be expanded as much as possible, making it easier for the user to insert their hand into this space. In addition, the top wall surface 146 is inclined such that the coin inlet 141 side (front side) thereof is higher and the taking-in port 371 side (back side) thereof is lower. Accordingly, it is possible to make it difficult for the components placed in the second housing 100$b$ to interfere with the coin inlet member 310 while widening the coin inlet 141 in the up-down direction.

The chute 380 is connected to the taking-in port 371. The taking-in port 371 is opened and closed by a shutter 391. An opening/closing mechanism 390 including the shutter 391 and an actuator 392 that drives the shutter 391 is placed behind the coin inlet portion 140. The shutter 391 is opened when a coin is inserted into the coin inlet portion 140.

As shown in FIG. 3A, a banknote discharge table 132 is provided at a bottom portion of the banknote outlet portion 130. Banknotes are discharged from the banknote handling assembly 200 to the banknote discharge table 132 by the operation of the banknote discharge mechanism 240. A lid portion 133 for covering discharged banknotes is provided at the banknote discharge table 132. The lid portion 133 is locked by a locking mechanism, and when all banknotes to be dispensed are discharged to the banknote discharge table 132, the lock is released and the lid portion 133 is opened. A residual detection sensor is placed at the banknote discharge table 132, and when the residual detection sensor detects that all the discharged banknotes have been removed, the lid portion 133 is closed.

A coin reception portion 152 is provided at a bottom portion of the coin outlet portion 150. A front portion of the coin reception portion 152 projects frontward from the first operation surface 101 of the first housing 100*a*. Coins discharged from the coin handling assembly 300 to the coin outlet portion 150 are accumulated in the coin reception portion 152.

Figure 8:
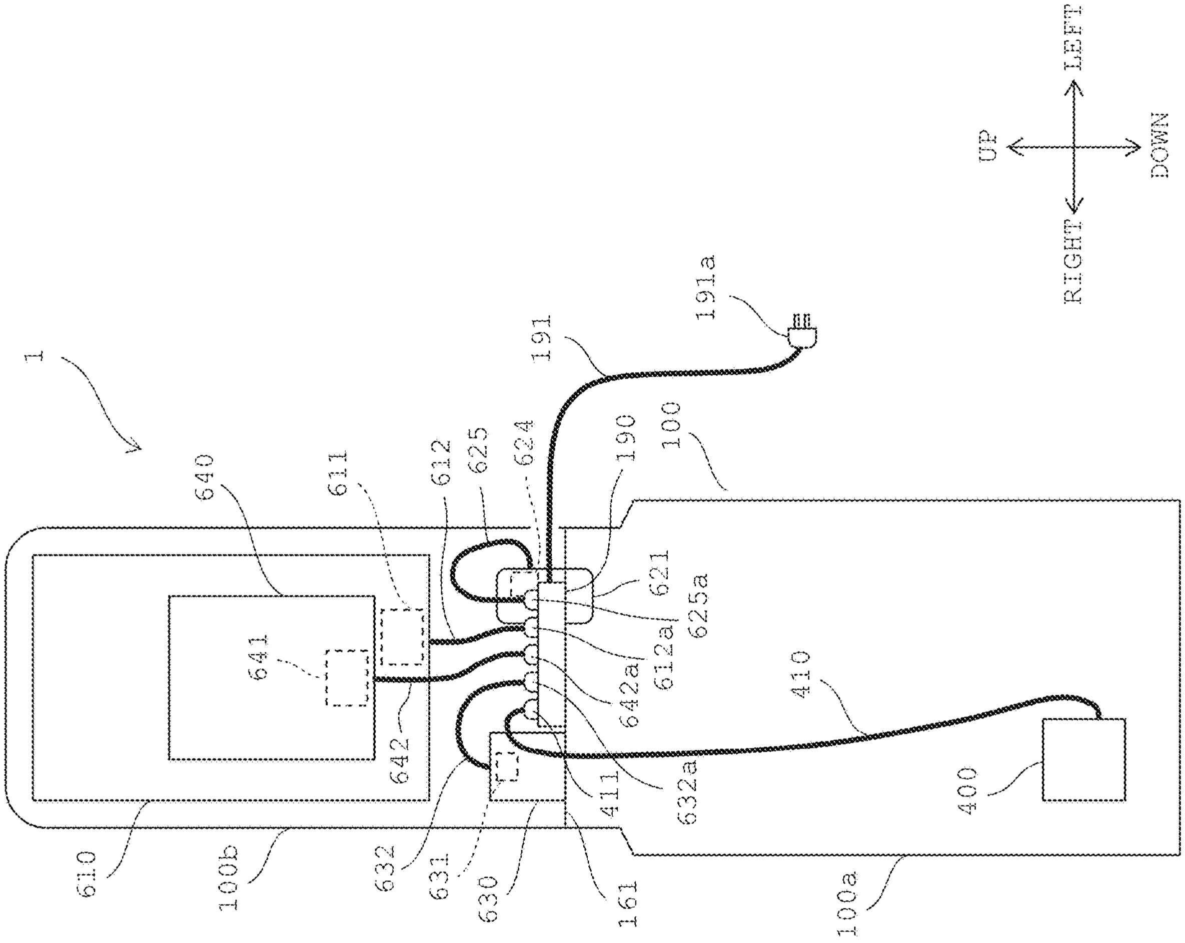
FIG. 8 is a schematic diagram illustrating a routing process of power cords in the automatic transaction apparatus according to the embodiment.

FIG. 8 is a schematic diagram illustrating a routing process of power cords in the automatic transaction apparatus 1. FIG. 8 is a back view of the interior of the first housing 100*a* and the second housing 100*b*.

A power strip 190 having five plug sockets is placed on the installation plate 160 within the second housing 100*b*.

A plug 411 of a power cord 410 extending from the power supply assembly 400 is connected to the power strip 190. In addition, a power supply unit 611 that supplies power to the display 610 is built in the display 610, and a plug 612*a* of a power cord 612 extending from the power supply unit 611 is connected to the power strip 190. Furthermore, the settlement terminal 621 of the operation device 620, the printer 630, and the control assembly 640 also respectively have built-in power supply units 624, 631, and 641 that supply power thereto, and plugs 625*a*, 632*a*, and 642*a* of power cords 625, 632, and 642 extending from these power supply units 624, 631, and 641 are also connected to the power strip 190.

A power cord 191 of the power strip 190 extends from the inside of the second housing 100*b* to the outside, and a plug 191*a* of the power cord 191 is connected to a commercial power supply outlet. AC power from the commercial power supply is supplied to the power supply assembly 400 and the respective power supply units 611, 624, 631, and 641 of the display 610, the settlement terminal 621, the printer 630, and the control assembly 640 via the power strip 190.

The power supply unit 611 of the display 610 and at least one of the power supply units of the settlement terminal 621, the printer 630, and the control assembly 640 may be integrated, and in this case, the integrated power supply unit is connected to the power strip 190. For example, when power is supplied from one power supply unit to the display 610, the settlement terminal 621, the printer 630, and the control assembly 640, the plug of the power cord of the power supply unit and the plug 411 of the power cord 410 of the power supply assembly 400 are connected to the power strip 190.

Next, the operation of the automatic transaction apparatus 1 will be described.

When performing a transaction such as purchase of a commodity using the automatic transaction apparatus 1, the user (customer) stands in front of the first operation surface 101 and the second operation surface 102 of the automatic transaction apparatus 1. The user is detected by the human sensor 650. The display 610 lights up, and the screen for ordering a transaction target is displayed on the display 610.

The user performs predetermined operations on the screen displayed on the display 610, to order a transaction target (commodity, service) and select a settlement method for the price of the transaction target. Information on the ordered transaction target and information on the selected settlement method are transmitted from the display 610 to the control assembly 640.

The control assembly 640 transmits the information on the ordered transaction target to a terminal device such as a personal computer that is installed in the store and receives orders for transaction targets.

Furthermore, if the settlement method is electronic settlement, the control assembly 640 receives an operation for electronic settlement by the user at the operation device 620, that is, at the settlement terminal 621, and executes a process of performing electronic settlement of the price of the ordered transaction target, based on this operation.

On the other hand, if the settlement method is cash settlement, the control assembly 640 gives an instruction to the control assembly 500 to accept depositing.

In response to receiving the instruction to accept depositing, the control assembly 500 causes the banknote handling assembly 200 and the coin handling assembly 300 to start operating for the depositing process. The banknote handling assembly 200 lights up or blinks the LED on the display board 215 at the banknote inlet portion 120. In addition, the coin handling assembly 300 lights up or blinks the LED on the display board 377 at the coin inlet portion 140, and opens the shutter 391 to open the taking-in port 371 of the coin reception portion 370.

When paying the price with banknotes, the user inserts one or more banknotes into the banknote inlet portion 120. That is, the user places the banknotes on the banknote insertion table 211 and inserts the banknotes into the inlet 212 within the banknote inlet portion 120.

In addition, when paying the price with coins, the user inserts one or more coins into the coin inlet portion 140. That is, the user inserts the coins into the coin reception portion 370 within the coin inlet portion 140. At this time, the user may place the coins in the passage 372 of the coin reception portion 370, or may place the coins on the front coin reception portion 376 of the coin reception portion 370 to check the number and the denominations of the coins, and then pour the coins into the passage 372. The inserted coins flow into the taking-in port 371.

Furthermore, when paying the price with banknotes and coins, the user inserts banknotes into the banknote inlet portion 120 and inserts coins into the coin inlet portion 140.

In the automatic transaction apparatus 1, the banknote inlet portion 120 and the coin inlet portion 140 are arranged side by side at the same height position, so that it is easier for the user to recognize that the banknote inlet portion 120 and the coin inlet portion 140 are the same inlet portion. Therefore, it becomes easier for the user to smoothly insert banknotes and coins into the banknote inlet portion 120 and the coin inlet portion 140. Furthermore, since the coin inlet 141 is wider in the up-down direction than the banknote inlet 121, it becomes easier for the user to insert a plurality of coins into the coin reception portion 370 through the coin inlet 141.

Figure 9B:
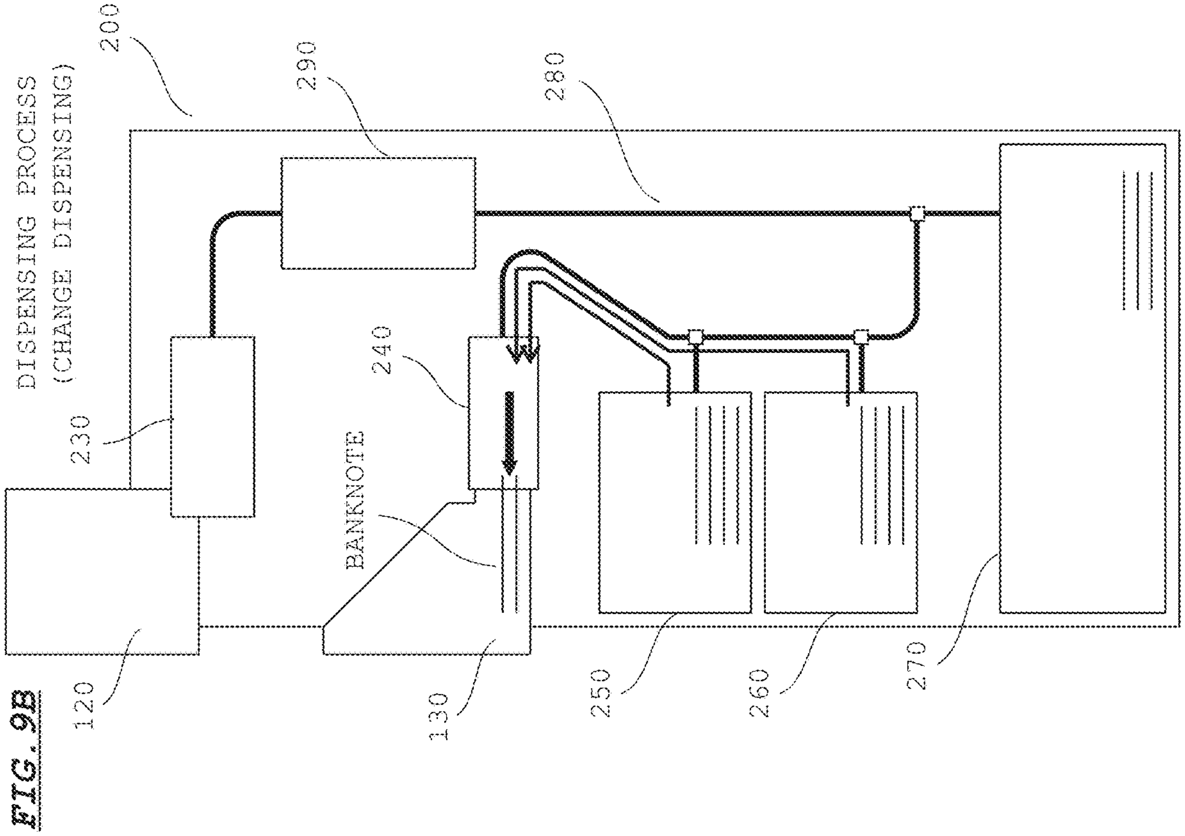
FIGS. 9A and 9B respectively illustrate a depositing process and a dispensing process of the banknote handling assembly according to the embodiment.
Figure 9A:
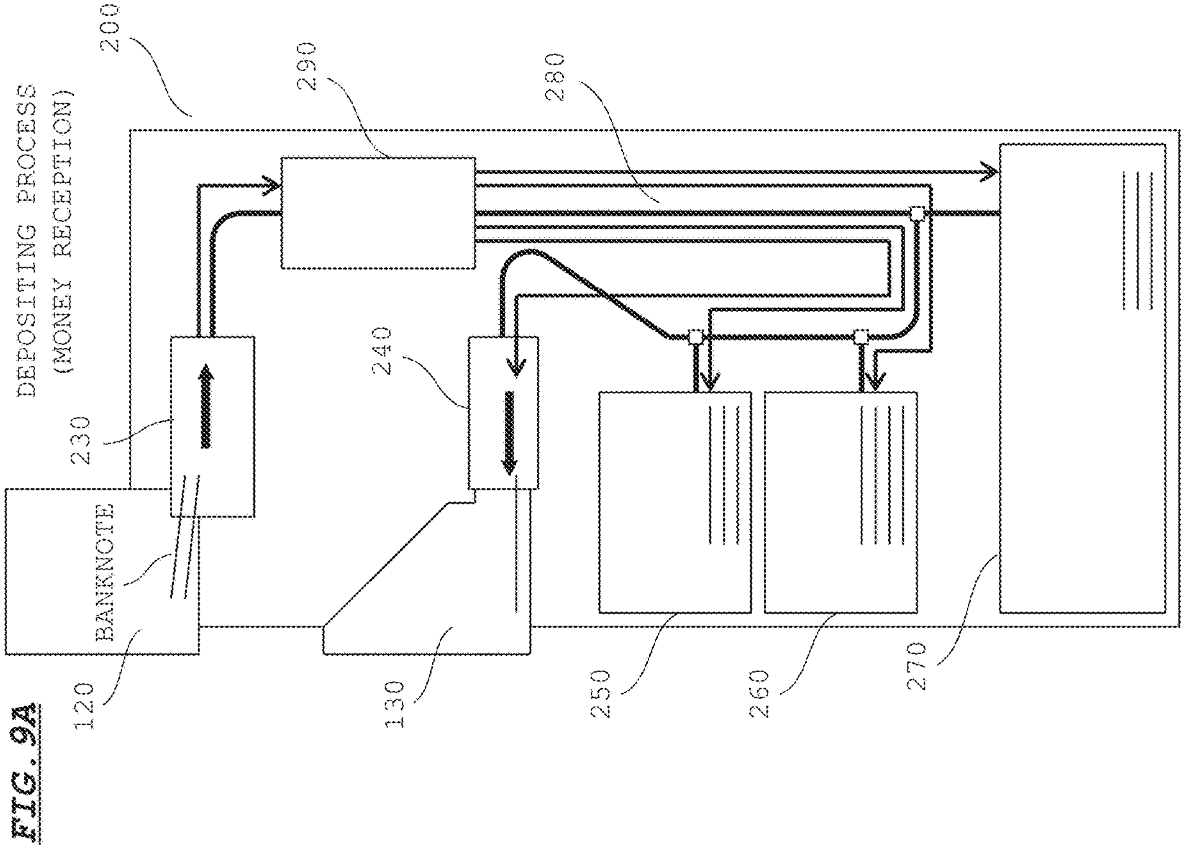

As shown in FIG. 9A, in the banknote handling assembly 200, when the depositing process is executed, banknotes inserted into the banknote inlet portion 120 are taken into the banknote handling assembly 200 through the inlet 212 and sent to the banknote transport unit 280 by the operation of the banknote taking-in unit 230. The banknotes flowing in the banknote transport unit 280 pass through the banknote recognition unit 290 and the attributes thereof are recognized. As a result of the recognition by the banknote recognition unit 290, the banknotes that are normal banknotes and whose denominations could be recognized are transported and stored into the banknote collection container 270, the first banknote storage container 250, or the second banknote storage container 260 in accordance with the denominations thereof. On the other hand, as a result of the recognition by the banknote recognition unit 290, the banknotes that are not normal banknotes or the banknotes whose denominations could not be recognized are transported to the banknote discharge mechanism 240 and discharged to the banknote outlet portion 130 by the operation of the banknote discharge mechanism 240. When the banknotes pass through the banknote recognition unit 290, the banknotes are counted.

Figure 10A:
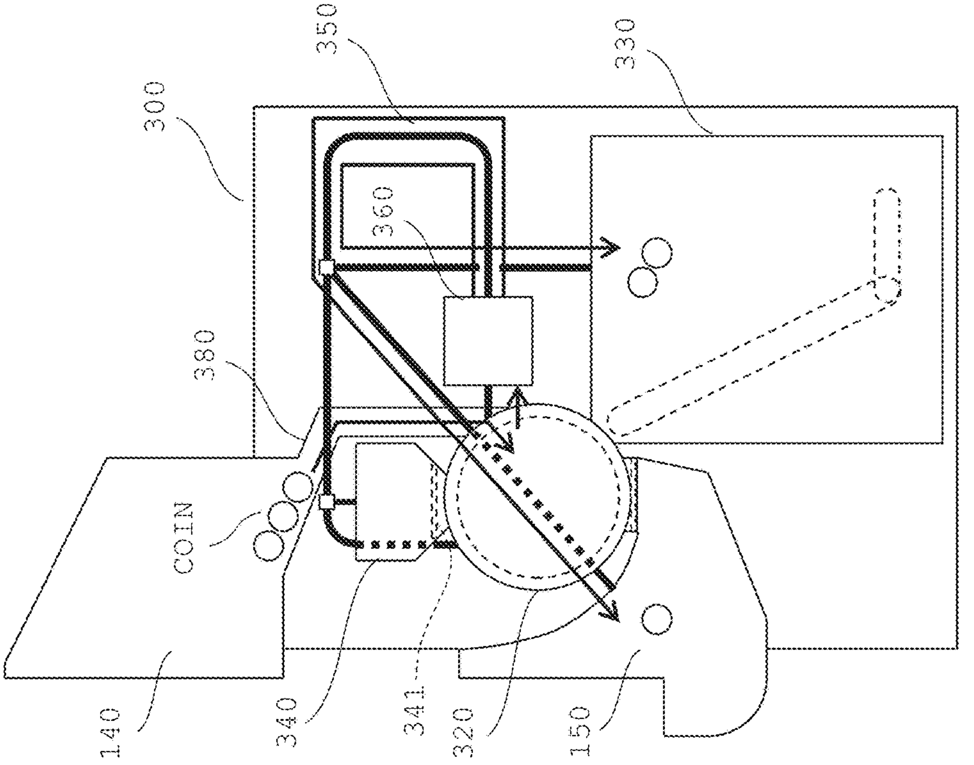
FIGS. 10A and 10B respectively illustrate a depositing process and a dispensing process of the coin handling assembly according to the embodiment.

As shown in FIG. 10A, in the coin handling assembly 300, when the depositing process is executed, coins inserted into the coin inlet portion 140 are taken into the coin handling assembly 300 through the taking-in port 371 and introduced into the coin feeding unit 320 through the chute 380. The coins in the coin feeding unit 320 are fed out to the coin transport unit 350. The coins flowing in the coin transport unit 350 pass through the coin recognition unit 360 and the attributes thereof are recognized. As a result of the recognition by the coin recognition unit 360, the coins that are normal coins and whose denominations could be recognized are transported and stored into the coin storage container 330. On the other hand, as a result of the recognition by the coin recognition unit 360, the coins that are not normal coins or the coins whose denominations could not be recognized are transported to the coin outlet portion 150 and discharged to the coin outlet portion 150. When the coins pass through the coin recognition unit 360, the coins are counted.

When the depositing process is completed, the control assembly 500 obtains the amount of the deposited money based on the counted number of banknotes or coins of each denomination, and notifies the control assembly 640 of this amount. At the control assembly 640, a change amount is calculated based on the notified amount of the deposited money and the monetary amount corresponding to the transaction, and if change is required, a dispensing instruction is sent to the control assembly 500 together with information regarding the change amount. The information regarding the change amount includes the denominations and the numbers of banknotes and coins to be dispensed. In response to receiving the dispensing instruction, the control assembly 500 controls the banknote handling assembly 200 and the coin handling assembly 300 to dispense the change. Depending on whether the change is only banknotes, only coins, or banknotes and coins, only the banknote handling assembly 200, only the coin handling assembly 300, or both handling assemblies 200 and 300 start operating for the dispensing process.

As shown in FIG. 9B, in the banknote handling assembly 200, when the dispensing process is started, each banknote of each denomination determined as change is fed out from the first banknote storage container 250 and/or the second banknote storage container 260 to the banknote transport unit 280 and transported to the banknote discharge mechanism 240. Then, each banknote is discharged to the banknote outlet portion 130 by the operation of the banknote discharge mechanism 240.

Figure 10B:
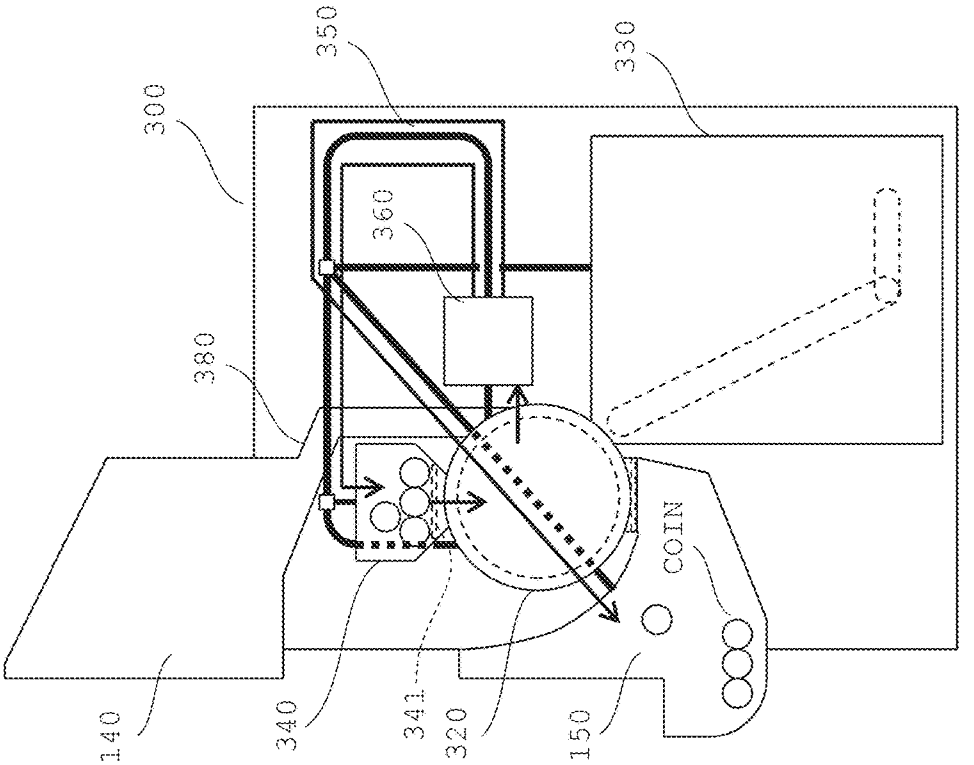

As shown in FIG. 10B, in the coin handling assembly 300, coins that can be change by a dispensing preparation process described later are temporarily stored in the coin temporary storage portion 340 in a state where the denominations thereof are mixed. When the dispensing process is started, the shutter 341 of the coin temporary storage portion 340 opens and the coins fall into the coin feeding unit 320. The coins in the coin feeding unit 320 are fed out to the coin transport unit 350, and pass through the coin recognition unit 360, and the denominations thereof are recognized. Each coin of each denomination determined as change is transported to the coin outlet portion 150 and discharged to the coin outlet portion 150. On the other hand, each coin of each denomination not determined as change is returned to the coin temporary storage portion 340.

When dispensing of the change is completed as described above, the control assembly 500 notifies the control assembly 640 that the cash handling has been completed.

When the process of electronic settlement is completed or when the control assembly 640 receives notification that the cash handling has been completed, the control assembly 640 causes the printer 630 to print a receipt. The printed receipt is discharged from the discharge port 170 of the second operation surface 102.

The calculation for cash settlement may be executed by the control assembly 500. In that case, the control assembly 640 notifies the control assembly 500 of the price of the transaction target ordered on the screen. The control assembly 500 controls the banknote handling assembly 200 and the coin handling assembly 300, that is, the money handling assembly 10*a*, to count the money (banknotes, coins) inserted into at least one of the banknote inlet portion 120 and the coin inlet portion 140, and to perform a depositing/dispensing process of discharging money to at least one of the banknote outlet portion 130 and the coin outlet portion 150, if there is a difference between the amount of the inserted money and the notified amount.

When the inserted money is counted and the depositing process is completed, the control assembly 500 obtains the amount of the deposited money based on the counted number of banknotes or coins of each denomination, and determines whether or not change is required, by comparing this amount with the price of the transaction target. If change is required, the control assembly 500 calculates the amount of the change and determines the denominations and numbers of banknotes and coins to be dispensed. Then, to dispense the change, the control assembly 500 controls the banknote handling assembly 200 and the coin handling assembly 300 to perform a dispensing process of discharging at least either banknotes or coins in accordance with the amount of the change. After the depositing process is executed, the dispensing process is executed if necessary, and the reception of the amount of cash corresponding to the transaction is completed, the control assembly 500 notifies the control assembly 640 that the cash transaction has been completed.

Figure 11:
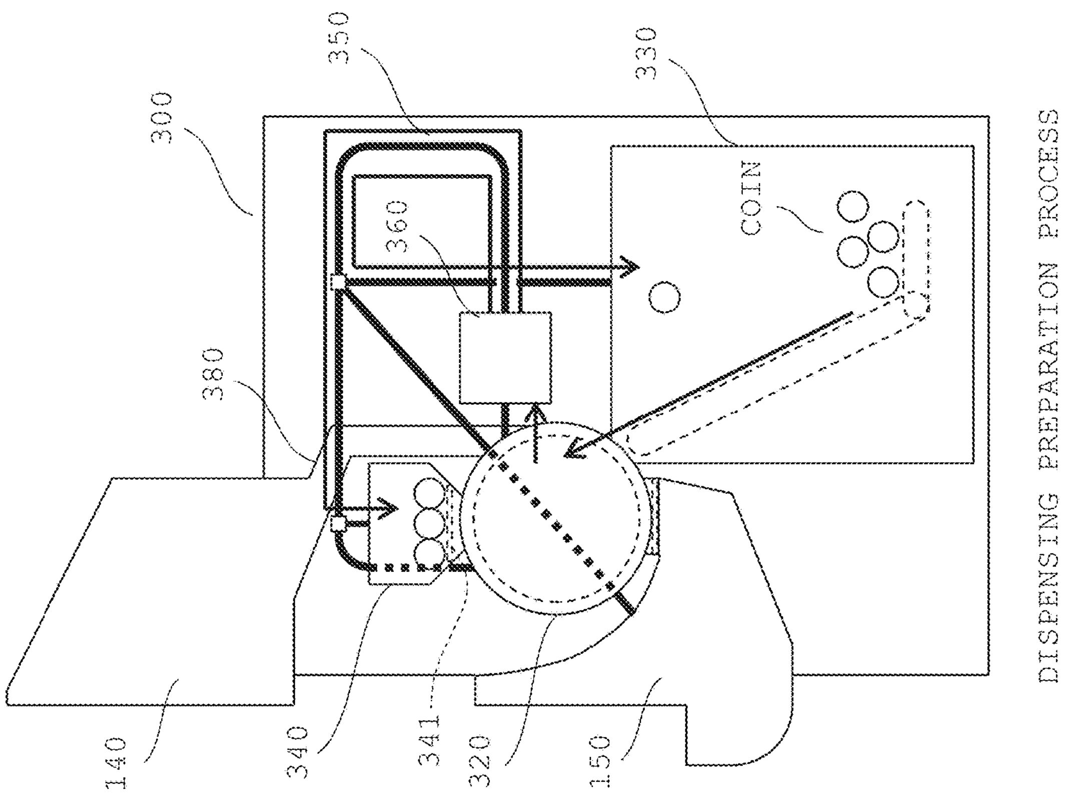
FIG. 11 illustrates a dispensing preparation process of the coin handling assembly according to the embodiment.

When a transaction with cash is executed and there is no coin in the coin temporary storage portion 340 or the coins in the coin temporary storage portion 340 are insufficient, the dispensing preparation process is started. As shown in FIG. 11, coins are transported from the coin storage container 330 to the coin feeding unit 320, and the coins are fed out from the coin feeding unit 320 to the coin transport unit 350. The denominations of the coins are recognized by the coin recognition unit 360, the coins of each denomination required for replenishment are transported to the coin temporary storage portion 340, and the coins of each denomination not required for replenishment are returned to the coin storage container 330. When an appropriate amount of coins is temporarily stored in the coin temporary storage portion 340, the dispensing preparation process ends.

Figure 12:
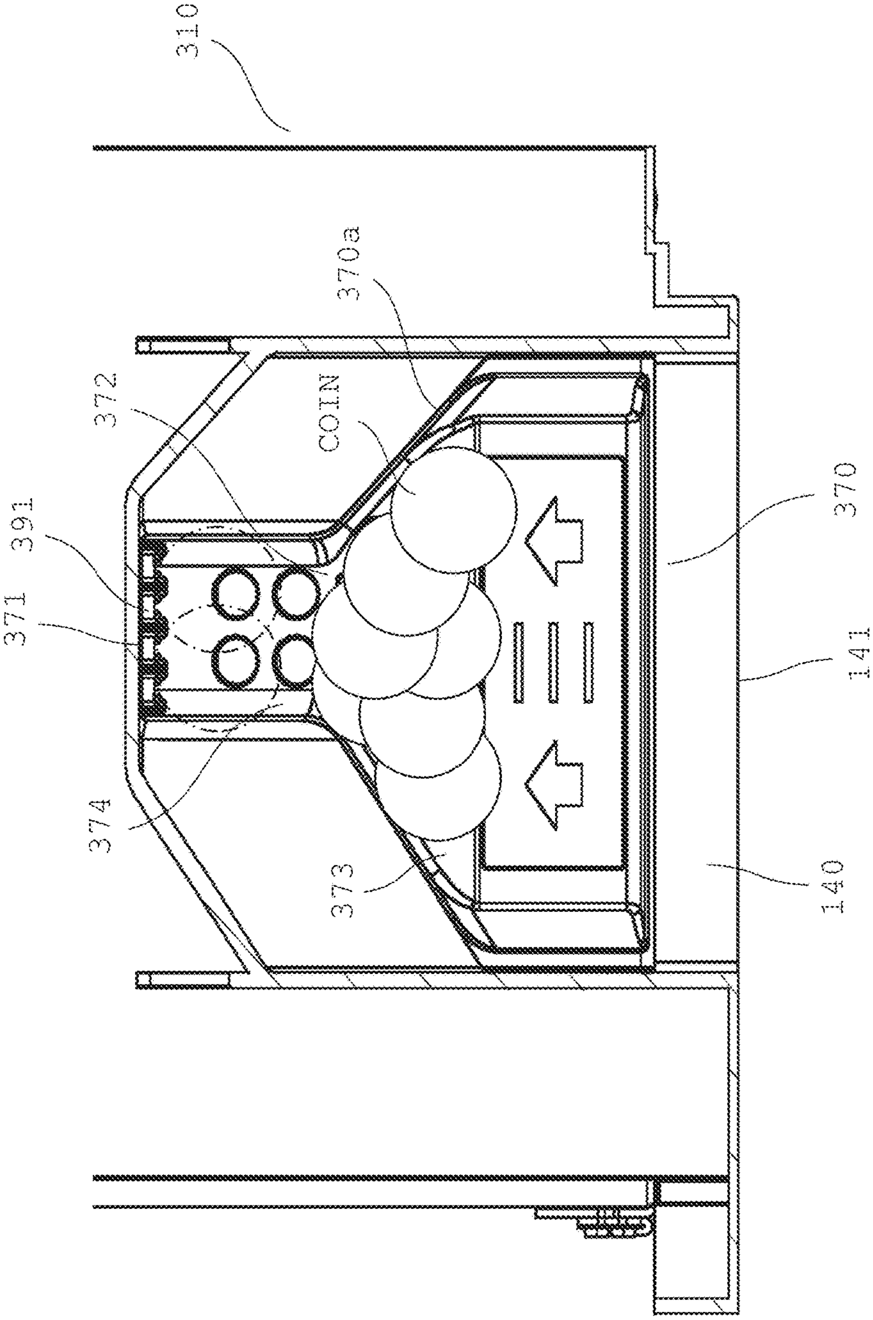
FIG. 12 shows a state where coins are jammed in a coin reception portion of the coin inlet portion according to the embodiment.

FIG. 12 shows a state where coins are jammed in the coin reception portion 370 of the coin inlet portion 140.

If many coins are inserted into the coin reception portion 370 of the coin inlet portion 140 at once, a coin jam may occur. As described above, the passage 372 of the coin reception portion 370 is composed of the first passage 373 that has a width gradually narrowing toward the taking-in port 371 side and the second passage 374 that extends from the exit of the first passage 373 to the taking-in port 371. Therefore, a coin jam does not occur near the taking-in port 371, which is located at the backmost portion of the coin inlet portion 140 (see an alternate long and short dash line), but rather at the exit of the first passage 373, which is located frontward of the taking-in port 371 by the length of the second passage 374, and a state where the coins are accumulated in the first passage 373 occurs. Thus, the user can easily visually recognize that the coin jam has occurred in the coin reception portion 370, through the coin inlet 141.

The automatic transaction apparatus 1 can perform a banknote replenishment process of replenishing the first banknote storage container 250 and the second banknote storage container 260 of the banknote handling assembly 200 with banknotes and a coin replenishment process of replenishing the coin storage container 330 of the coin handling assembly 300 with coins. The banknotes for replenishment are inserted into the banknote inlet portion 120 and transported to the first banknote storage container 250 and the second banknote storage container 260 by the banknote transport unit 280. In addition, the coins for replenishment are inserted into the coin inlet portion 140 and transported to the coin storage container 330 by the coin transport unit 350.

In the automatic transaction apparatus 1, the height positions of the banknote inlet portion 120 and the coin inlet portion 140 are the same. Thus, when replenishment with banknotes and replenishment with coins are performed in parallel, one dedicated tray is placed in front of the banknote inlet portion 120 and the coin inlet portion 140, whereby replenishment with banknotes and replenishment with coins can be performed while the dedicated tray prevents banknotes or coins from falling onto the floor surface.

Modifications

Although the embodiment of the present disclosure has been described above, the present disclosure is not limited by the above embodiment, etc., in any way, and various modifications other than the above may also be made to the embodiment of the present disclosure.

For example, the lower end of the banknote inlet 121 and the lower end of the coin inlet 141 may be shifted from each other in the up-down direction, and the upper end of the banknote outlet 131 and the upper end of the coin outlet 151 may be shifted from each other in the up-down direction. In addition, the center in the right-left direction of the banknote inlet portion 120 and the center in the right-left direction of the banknote outlet portion 130 may be shifted from each other.

Furthermore, the coin inlet 141 does not have to extend upward more than the banknote inlet 121. In addition, even if the coin inlet 141 extends upward more than the banknote inlet 121, the operation device 620 does not have to overlap the coin inlet portion 140 when viewed in the right-left direction.

Furthermore, the dimension D1 in the up-down direction of the coin inlet 141 does not have to be made larger than the dimension D2 in the up-down direction of the banknote inlet 121.

Furthermore, the discharge port 170 for receipts does not have to be aligned with the operation device 620 in the right-left direction so as to overlap the operation device 620 when viewed in the right-left direction.

Furthermore, the configuration of the banknote inlet portion 120, the banknote outlet portion 130, the coin inlet portion 140, and the coin outlet portion 150 is not limited to the configuration of the above embodiment. For example, the banknote inlet portion 120 does not have to be formed in a cavity shape and may be composed of an elongated substantially quadrangular banknote inlet portion into which banknotes are inserted, and the banknote outlet portion 130 does not have to be formed in a cavity shape and may be composed of an elongated substantially quadrangular banknote discharge port to which banknotes are discharged. For example, in the coin inlet portion 140, the coin reception portion 370 may protrude frontward from the first operation surface 101, and in the coin outlet portion 150, the coin reception portion 152 does not have to protrude frontward from the first operation surface 101. Furthermore, in the coin inlet portion 140, the coin reception portion 370 may have a passage having a shape different from that of the passage 372.

Furthermore, the power supply assembly 400 may be placed at a position other than the above. In addition, within the first housing 100*a*, two power supply assemblies that supply power to the banknote handling assembly 200 and the coin handling assembly 300, respectively, may be provided in the space below the coin handling assembly 300 or at other locations. Similarly, the control assembly 500 may also be placed at a position other than the space below the coin handling assembly 300.

Furthermore, the configuration of the banknote handling assembly 200 and the coin handling assembly 300 is not limited to the configuration of the above embodiment, and may be any configuration as long as a process of depositing/dispensing banknotes and coins can be performed.

Furthermore, as shown by an alternate long and short dash line in FIG. 2B, the first housing 100*a* and the second housing 100*b* may have the same dimension in the front-back direction, that is, the housing 100 may be formed in a quadrangular shape rather than an L-shape when viewed in the right-left direction.

However, as in the above embodiment, the amount of material required to form the second housing 100*b* can be reduced by making the second housing 100*b* thinner in the front-back direction than the first housing 100*a*. In addition, as shown by an alternate long and two short dashes line in FIG. 2B, it is possible to install an operation display apparatus, which has the same configuration as the operation display apparatus 1B and which allows transaction targets to be ordered and electronic settlement to be performed, on the first housing 100*a*, that is, the money handling apparatus 1A and behind the second housing 100*b* such that an operation surface having a display thereof, etc., faces backward.

Furthermore, by placing a ticket issuing device inside the second housing 100*b* and providing a ticket issuing port in the second operation surface 102, a coupon (use ticket) for a transaction target may be issued from the ticket issuing port when the transaction target is ordered on the display 610. Moreover, the input of instructions for transactions is not limited to the input for ordering transaction targets.

Furthermore, the present disclosure may be applied to a money handling apparatus that does not include an operation display apparatus having a display for inputting instructions for transactions and an operation device for performing electronic settlement of monetary amounts corresponding to transactions, for example, a money depositing/dispensing apparatus that is installed in a financial institution or the like and in which cash is deposited and dispensed.

Figure 13:
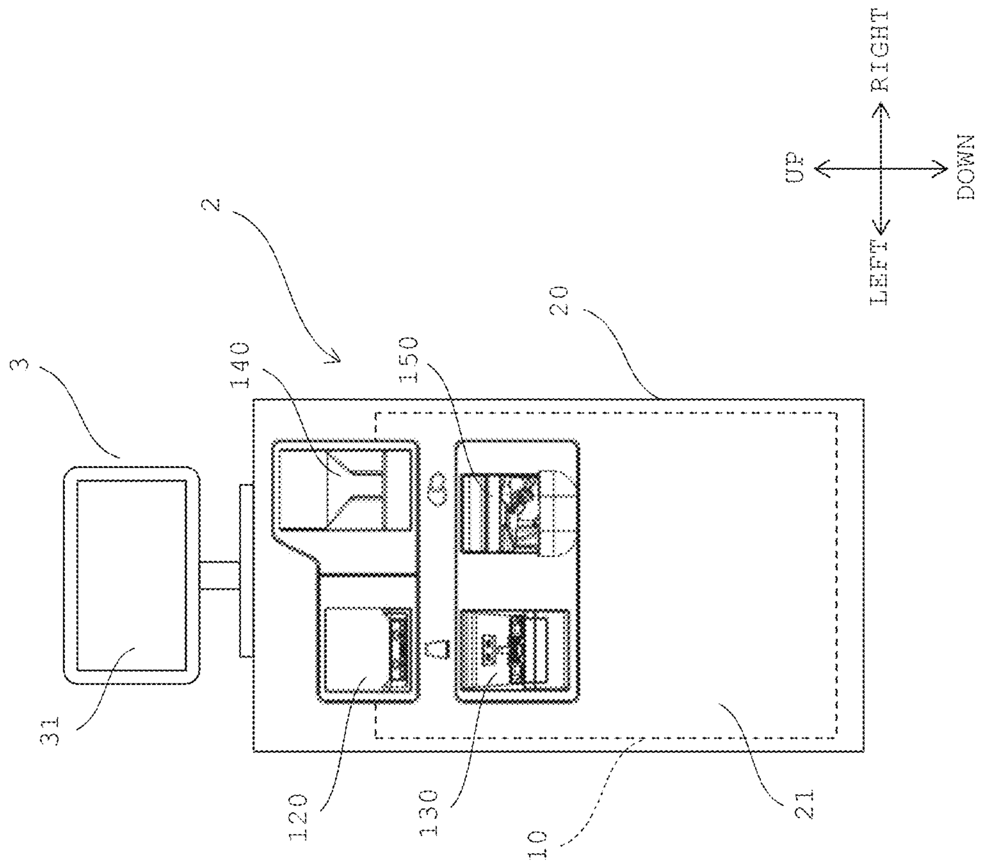
FIG. 13 is a front view of a money depositing/dispensing apparatus according to a modification.

As shown in FIG. 13, a money depositing/dispensing apparatus 2 includes, within a housing 20 having a substantially rectangular parallelepiped shape, a money handling block 10 configured by integrating a banknote handling assembly 200, a coin handling assembly 300, a power supply assembly 400, and a control assembly 500 which are the same as in the money handling apparatus 1A. A banknote inlet portion 120, a banknote outlet portion 130, a coin inlet portion 140, and a coin outlet portion 150 are provided in an operation surface 21 that is the front surface of the housing 20. Banknotes and coins to be deposited into the banknote handling assembly 200 and the coin handling assembly 300 are inserted into the banknote inlet portion 120 and the coin inlet portion 140, respectively. Banknotes and coins dispensed from the banknote handling assembly 200 and the coin handling assembly 300 are discharged to the banknote outlet portion 130 and the coin outlet portion 150, respectively. An information terminal device 3 is installed on the upper surface of the money depositing/dispensing apparatus 2 so as to be able to communicate with the money depositing/dispensing apparatus 2. The information terminal device 3 has an operation/display unit 31 on which operations for depositing and dispensing are performed. An operation/display unit may be provided on the upper surface or the front surface of the money depositing/dispensing apparatus 2 instead of the information terminal device 3 being installed.

In addition to the above, the embodiment of the present disclosure can be modified as appropriate within the scope of the claims.

What is claimed is:

1. A money handling apparatus, comprising:

a banknote handling assembly to handle banknotes;

a coin handling assembly to handle coins;

a control assembly positioned below the coin handling assembly, the control assembly configured to control the banknote handling assembly and the coin handling assembly; and a first housing including a front which faces a front direction along a front-back axis of the money handling apparatus, the front of the first housing including a banknote inlet portion into which banknotes are deposited into the banknote handling assembly, a banknote outlet portion through which banknotes are dispensed from the banknote handling assembly, a coin inlet portion into which coins are deposited into the coin handling assembly, and a coin outlet portion through which coins are dispensed from the coin handling assembly, wherein along a right-left axis of the money handling apparatus, the right-left axis being perpendicular to the front-back axis:

the banknote inlet portion and the coin inlet portion are aligned, and the banknote outlet portion and the coin outlet portion are aligned, and along an up-down axis of the money handling apparatus, the up-down axis being perpendicular to the right-left axis and perpendicular to the front-back axis:

the banknote inlet portion and the banknote outlet portion overlap, and the coin inlet portion and the coin outlet portion overlap.

2. The money handling apparatus according to claim 1, wherein the banknote inlet portion has a cavity shape and includes a banknote inlet that is open in the front of the first housing, the coin inlet portion has a cavity shape and includes a coin inlet that is open in the front of the first housing, and a lower end of the banknote inlet and a lower end of the coin inlet are at a same position along the up-down axis.

3. The money handling apparatus according to claim 1, wherein the banknote inlet portion has a cavity shape and includes a banknote inlet that is open in the front of the first housing, the coin inlet portion has a cavity shape, includes a coin inlet that is open in the front of the first housing, and includes a coin reception portion that can receive a plurality of coins, at a bottom portion thereof, and along the up-down axis, the coin inlet is larger than the banknote inlet.

4. The money handling apparatus according to claim 1, wherein the coin inlet portion has a cavity shape, includes a coin inlet that is open in the front of the first housing, and includes a coin reception portion that can receive a plurality of coins, at a bottom portion thereof, in an interior of the coin reception portion, a taking-in port for taking coins into the coin handling assembly is provided at an end portion opposite to the coin inlet side, and a passage that has a sloping bottom surface sloping downward toward the taking-in port side and in which coins flow toward the taking-in port is provided, and the passage includes a first passage that has an entrance width wider than a width of the taking-in port and has a width gradually narrowing toward the taking-in port side, and a second passage that extends from an exit of the first passage to the taking-in port.

5. The money handling apparatus according to claim 1, wherein the banknote handling assembly and the coin handling assembly are provided in the first housing, and the money handling apparatus further comprises a power supply assembly configured to supply power to both the banknote handling assembly and the coin handling assembly.

6. The money handling apparatus according to claim 5, wherein the banknote handling assembly and the coin handling assembly are arranged in a direction in which the banknote inlet portion and the coin inlet portion are aligned, the banknote inlet portion is located at an upper portion of the banknote handling assembly, the coin inlet portion is located at an upper portion of the coin handling assembly, along the up-down axis, the banknote handling assembly is larger than the coin handling assembly, and the power supply assembly is placed below the coin handling assembly within the first housing.

7. The money handling apparatus according to claim 6, wherein the control assembly is below the coin handling assembly within the first housing so as to be adjacent to a side, of the power supply assembly, opposite to the banknote handling assembly side.

8. The money handling apparatus according to claim 1, further comprising:

an operation display apparatus including:

a display for input of an instruction for a transaction;

an operation device in which an operation for performing electronic settlement of a monetary amount corresponding to the transaction is performed; and a second housing having an operation surface in which the display and the operation device are provided, wherein banknotes inserted into the banknote inlet portion are counted by the banknote handling assembly, coins inserted into the coin inlet portion are counted by the coin handling assembly, when there is a difference between an amount of the inserted banknotes and coins and the monetary amount corresponding to the transaction, the money handling apparatus discharges banknotes or coins to at least one of the banknote outlet portion and the coin outlet portion, the display is provided above the banknote inlet portion and the coin inlet portion in the operation surface, and the operation device is provided between the banknote inlet portion and the coin inlet portion, and the display in the operation surface.

9. The money handling apparatus according to claim 8, wherein the banknote inlet portion has a cavity shape and includes a banknote inlet that is open in the front of the first housing, the coin inlet portion has a cavity shape, includes a coin inlet that is open in the front of the first housing, and includes a coin reception portion that can receive a plurality of coins, at a bottom portion thereof, along the up-down axis, the coin inlet is larger than the banknote inlet, and the coin inlet extends upward more than the banknote inlet, and along the up-down axis, the operation device overlaps the banknote inlet portion, and along the right-left axis, the operation device overlaps the coin inlet portion in the operation surface.

10. The money handling apparatus according to claim 8, wherein a discharge port to which a receipt related to the transaction and printed by a printer is discharged is placed in the operation surface and aligned with the operation device along the right-left axis so as to overlap the operation device along the right-left axis.

11. The money handling apparatus according to claim 8, wherein the first housing and the second housing are opened and closed separately, and a boundary between the first housing and the second housing has a stepped shape in which the banknote inlet portion side thereof is lower and the coin inlet portion side thereof is higher.

12. The money handling apparatus according to claim 1, wherein a depositing opening is provided in the front of the first housing, and the banknote inlet portion and the coin inlet portion are provided within the depositing opening.

13. The money handling apparatus according to claim 12, wherein an upper end of the depositing opening has a stepped shape in which the banknote inlet portion side thereof is lower and the coin inlet portion side thereof is higher.

14. The money handling apparatus according to claim 1, wherein a dispensing opening is provided in the front of the first housing, and the banknote outlet portion and the coin outlet portion are provided within the dispensing opening.

15. The money handling apparatus according to claim 1, wherein the banknote handling assembly and the coin handling assembly are pulled together out of the first housing, and a coin storage container configured to store coins is provided on a surface side opposite to a surface adjacent to the banknote handling assembly in the coin handling assembly.

16. A money handling apparatus, comprising:

a banknote handling assembly to handle banknotes;

a coin handling assembly to handle coins, the coin handling assembly comprising a coin storage container to store coins of mixed denominations and to discharge the stored coins;

a first housing including a front which faces a front direction along a front-back axis of the money handling apparatus, the front of the first housing including a banknote inlet portion into which banknotes are deposited into the banknote handling assembly, a banknote outlet portion through which banknotes are dispensed from the banknote handling assembly, a coin inlet portion into which coins are deposited into the coin handling assembly, and a coin outlet portion through which coins are dispensed from the coin handling assembly, wherein along a right-left axis of the money handling apparatus, the right-left axis being perpendicular to the front-back direction:

the banknote inlet portion and the coin inlet portion are aligned, and the banknote outlet portion and the coin outlet portion are aligned, and along an up-down axis of the money handling apparatus, the up-down axis being perpendicular to the right-left axis and perpendicular to the front-back axis:

the banknote inlet portion and the banknote outlet portion overlap, and the coin inlet portion and the coin outlet portion overlap.

17. The money handling apparatus according to claim 16, further comprising a control assembly configured to control both the banknote handling assembly and the coin handling assembly.

18. A money handling apparatus, comprising:

a banknote handling assembly to handle banknotes;

a coin handling assembly to handle coins; and a first housing including a front which faces a front direction along a front-back axis of the money handling apparatus, the front of the first housing including a banknote inlet portion into which banknotes are deposited into the banknote handling assembly, a banknote outlet portion through which banknotes are dispensed from the banknote handling assembly, a coin inlet portion into which coins are deposited into the coin handling assembly, and a coin outlet portion through which coins are dispensed from the coin handling assembly, wherein along a right-left axis of the money handling apparatus, the right-left axis being perpendicular to the front-back axis:

the banknote inlet portion and the coin inlet portion are aligned, and the banknote outlet portion and the coin outlet portion are aligned, along an up-down axis of the money handling apparatus, the up-down axis being perpendicular to the right-left axis and perpendicular to the front-back axis:

the banknote inlet portion and the banknote outlet portion overlap, and the coin inlet portion and the coin outlet portion overlap, and along the up-down axis, the coin inlet has a first dimension which is larger than a second dimension of the banknote inlet.

* * * * *